United States Patent
Baseotto et al.

(10) Patent No.: US 8,292,984 B2
(45) Date of Patent: Oct. 23, 2012

(54) AIR CLEANER ARRANGMENTS WITH END SUPPORT FOR CARTRIDGE; COMPONENTS; AND, METHODS

(75) Inventors: Michel Baseotto, Hasselt (BE); Roberto Merckx, Vilvoorde (BE); Julien Dils, Linter (BE); Paul Coulonvaux, Brussels (BE)

(73) Assignee: Donaldson Company, Inc., Minneapolis, MN (US)

( * ) Notice: Subject to any disclaimer, the term of this patent is extended or adjusted under 35 U.S.C. 154(b) by 534 days.

(21) Appl. No.: 12/218,580

(22) Filed: Jul. 15, 2008

(65) Prior Publication Data
US 2009/0094951 A1  Apr. 16, 2009

Related U.S. Application Data

(60) Provisional application No. 61/072,162, filed on Mar. 27, 2008, provisional application No. 60/961,522, filed on Jul. 20, 2007, provisional application No. 60/961,521, filed on Jul. 20, 2007, provisional application No. 61/126,222, filed on Apr. 30, 2008.

(51) Int. Cl.
*B01D 46/00* (2006.01)

(52) U.S. Cl. .................. 55/498; 55/502; 55/503; 55/510

(58) Field of Classification Search ..................... 55/498, 55/502, 503, 504, 510; 210/493.2, 497.01, 210/497.2
See application file for complete search history.

(56) References Cited

U.S. PATENT DOCUMENTS

| | | |
|---|---|---|
| 2,771,156 A | 11/1956 | Kasten et al. |
| 3,002,870 A | 10/1961 | Belgarde et al. |
| 3,048,959 A | 8/1962 | Lowther |
| 3,078,650 A | 2/1963 | Anderson et al. |
| 3,160,488 A | 12/1964 | Wilber |
| 3,169,844 A | 2/1965 | Young |
| 3,290,870 A | 12/1966 | Jensen |
| 3,342,021 A | 9/1967 | Yelinek et al. |
| 3,342,335 A | 9/1967 | Gamundi et al. |
| 3,354,012 A | 11/1967 | Forman et al. |
| 3,357,163 A | 12/1967 | Burger et al. |
| 3,413,780 A | 12/1968 | Amlott et al. |
| 3,423,909 A | 1/1969 | Bennett et al. |

(Continued)

FOREIGN PATENT DOCUMENTS

BE   1011567 A3   11/1989

(Continued)

OTHER PUBLICATIONS

International Search Report and Written Opinion mailed Nov. 3, 2008.

(Continued)

*Primary Examiner* — Robert Clemente
(74) *Attorney, Agent, or Firm* — Merchant & Gould P.C.

(57) ABSTRACT

An air cleaner assembly is described and shown which includes a housing having an air flow inlet, an air flow outlet and a housing body and access cover. A serviceable filter cartridge is positioned within the housing. A projection/receiver arrangement providing for engagement between the cartridge and the access cover is provided. The projection/receiver arrangement can be configured in a manner that inhibits both cantilevered motion and rotational motion of the cartridge, once installed. An example projection/receiver arrangement is provided, which includes a serpentine receiving groove on the access cover and a serpentine projection on the filter cartridge.

16 Claims, 31 Drawing Sheets

U.S. PATENT DOCUMENTS

| | | |
|---|---|---|
| 3,452,519 A | 7/1969 | Bianchetta |
| 3,488,928 A | 1/1970 | Tarala |
| 3,584,439 A | 6/1971 | Gronholz |
| 3,616,618 A | 11/1971 | Gronholz et al. |
| 3,672,130 A | 6/1972 | Sullivan et al. |
| 3,710,560 A | 1/1973 | Maddocks |
| 3,716,436 A | 2/1973 | Pall et al. |
| 4,006,000 A | 2/1977 | Tortorici et al. |
| 4,036,616 A | 7/1977 | Byrns |
| 4,062,781 A | 12/1977 | Strauss et al. |
| 4,135,899 A | 1/1979 | Gauer |
| 4,159,197 A | 6/1979 | Schuler et al. |
| 4,211,543 A | 7/1980 | Tokar et al. |
| 4,222,755 A | 9/1980 | Grotto |
| 4,227,898 A | 10/1980 | Kamekawa et al. |
| 4,235,611 A | 11/1980 | Brownell |
| 4,303,426 A | 12/1981 | Battis |
| 4,312,651 A | 1/1982 | Esaki et al. |
| 4,349,363 A | 9/1982 | Patel et al. |
| 4,350,509 A | 9/1982 | Alseth et al. |
| 4,402,830 A | 9/1983 | Pall |
| 4,488,889 A | 12/1984 | McCarroll |
| 4,491,460 A | 1/1985 | Tokar |
| 4,498,915 A | 2/1985 | Witchell |
| 4,588,426 A | 5/1986 | Virgille et al. |
| 4,609,465 A | 9/1986 | Miller |
| 4,720,292 A | 1/1988 | Engel et al. |
| 4,728,423 A | 3/1988 | Kuwajima |
| 4,764,191 A | 8/1988 | Morelli |
| 4,801,383 A | 1/1989 | Hoffmann et al. |
| 4,818,261 A | 4/1989 | Beckon |
| 4,838,901 A | 6/1989 | Schmidt et al. |
| 4,950,317 A | 8/1990 | Dottermans |
| 5,045,192 A | 9/1991 | Terhune |
| 5,064,458 A | 11/1991 | Machado |
| 5,071,456 A | 12/1991 | Binder et al. |
| 5,082,476 A | 1/1992 | Kahlbaugh et al. |
| 5,112,417 A | 5/1992 | Sayles |
| 5,116,499 A | 5/1992 | Deibel |
| 5,118,417 A | 6/1992 | Deibel |
| 5,120,337 A | 6/1992 | Benzler et al. |
| 5,137,557 A | 8/1992 | Behrendt et al. |
| 5,160,519 A | 11/1992 | Svensson et al. |
| 5,167,683 A | 12/1992 | Behrendt et al. |
| 5,211,846 A | 5/1993 | Kott et al. |
| 5,238,476 A | 8/1993 | Svensson et al. |
| 5,250,179 A | 10/1993 | Spearman |
| 5,277,157 A | 1/1994 | Teich |
| 5,290,445 A | 3/1994 | Buttery |
| 5,431,168 A | 7/1995 | Webster, Jr. |
| 5,442,721 A | 8/1995 | Kalada et al. |
| 5,484,466 A | 1/1996 | Brown et al. |
| 5,545,241 A | 8/1996 | Vanderauwera et al. |
| 5,547,480 A | 8/1996 | Coulonvaux |
| 5,556,440 A | 9/1996 | Mullins et al. |
| 5,601,717 A | 2/1997 | Villette et al. |
| 5,605,555 A | 2/1997 | Patel et al. |
| 5,605,625 A | 2/1997 | Mills |
| 5,613,992 A | 3/1997 | Engel |
| 5,632,791 A | 5/1997 | Oussoren et al. |
| 5,685,985 A | 11/1997 | Brown et al. |
| 5,690,712 A | 11/1997 | Engel |
| 5,700,304 A | 12/1997 | Foo |
| 5,720,788 A | 2/1998 | Puckett et al. |
| 5,720,790 A | 2/1998 | Kometani et al. |
| 5,730,769 A | 3/1998 | Dungs et al. |
| 5,736,040 A | 4/1998 | Duerrstein et al. |
| 5,741,421 A | 4/1998 | Erdmannsdoerfer et al. |
| 5,753,117 A | 5/1998 | Jiang |
| 5,755,842 A | 5/1998 | Patel et al. |
| 5,755,844 A | 5/1998 | Arai et al. |
| 5,800,581 A | 9/1998 | Gielink et al. |
| D401,306 S | 11/1998 | Ward |
| 5,865,863 A | 2/1999 | DeSousa et al. |
| 5,882,367 A | 3/1999 | Morgan et al. |
| 5,893,937 A | 4/1999 | Moessinger |
| 5,897,676 A | 4/1999 | Engel et al. |
| 5,916,435 A | 6/1999 | Spearman et al. |
| 5,919,279 A | 7/1999 | Merritt et al. |
| 5,921,982 A | 7/1999 | Lesh et al. |
| 5,938,804 A | 8/1999 | Engel et al. |
| D414,544 S | 9/1999 | Ward et al. |
| 5,951,729 A | 9/1999 | Ernst et al. |
| 5,972,063 A | 10/1999 | Dudrey et al. |
| D416,308 S | 11/1999 | Ward et al. |
| 5,984,109 A | 11/1999 | Kanwar et al. |
| 6,004,366 A | 12/1999 | Engel et al. |
| 6,039,778 A | 3/2000 | Coulonvaux |
| 6,051,042 A | 4/2000 | Coulonvaux |
| 6,090,177 A | 7/2000 | Moessinger et al. |
| 6,099,606 A | 8/2000 | Miller et al. |
| 6,149,700 A | 11/2000 | Morgan et al. |
| 6,152,979 A | 11/2000 | Cappuyns |
| 6,171,275 B1 | 1/2001 | Webster, Jr. |
| 6,258,145 B1 | 7/2001 | Engel et al. |
| 6,261,334 B1 | 7/2001 | Morgan et al. |
| 6,290,739 B1 | 9/2001 | Gieseke et al. |
| 6,322,602 B2 | 11/2001 | Engel et al. |
| 6,383,244 B1 | 5/2002 | Wake et al. |
| 6,398,832 B2 | 6/2002 | Morgan et al. |
| 6,402,798 B1 | 6/2002 | Kallsen et al. |
| 6,413,289 B2 | 7/2002 | Engel et al. |
| 6,416,561 B1 | 7/2002 | Kallsen et al. |
| 6,419,718 B1 | 7/2002 | Klug et al. |
| 6,436,162 B1 | 8/2002 | Wake et al. |
| 6,447,567 B1 | 9/2002 | Ehrenberg |
| 6,485,535 B1 | 11/2002 | Linnersten et al. |
| D467,654 S | 12/2002 | Klug et al. |
| 6,521,009 B2 | 2/2003 | Engel et al. |
| D471,623 S | 3/2003 | Gieseke et al. |
| D475,129 S | 5/2003 | Ward et al. |
| 6,558,453 B2 | 5/2003 | Sepke et al. |
| 6,572,667 B1 | 6/2003 | Greif et al. |
| D477,659 S | 7/2003 | Gieseke et al. |
| 6,585,838 B1 | 7/2003 | Mullins et al. |
| 6,599,342 B2 | 7/2003 | Andress et al. |
| D481,101 S | 10/2003 | Boehrs |
| 6,652,614 B2 | 11/2003 | Gieseke et al. |
| D485,339 S | 1/2004 | Klug et al. |
| 6,736,874 B2 | 5/2004 | Rieger et al. |
| 6,837,920 B2 | 1/2005 | Gieseke et al. |
| D513,314 S | 12/2005 | Iddings et al. |
| 6,986,805 B2 | 1/2006 | Gieseke et al. |
| 7,070,642 B2* | 7/2006 | Scott et al. ............... 55/498 |
| 7,291,198 B2 | 11/2007 | Gieseke et al. |
| 7,326,342 B2* | 2/2008 | Richmond et al. ............ 210/234 |
| 7,413,588 B2* | 8/2008 | Holzmann et al. ............. 55/502 |
| 7,524,349 B2* | 4/2009 | Schrage et al. ............... 55/502 |
| 7,537,631 B2* | 5/2009 | Scott et al. ............... 55/498 |
| 7,572,310 B2 | 8/2009 | Gieseke |
| 7,662,203 B2* | 2/2010 | Scott et al. ............... 55/498 |
| 7,828,870 B1* | 11/2010 | Rech et al. ............... 55/498 |
| 2002/0014058 A1 | 2/2002 | Engel et al. |
| 2003/0051455 A1 | 3/2003 | Gieseke et al. |
| 2004/0025485 A1* | 2/2004 | Lee ............... 55/486 |
| 2004/0134171 A1 | 7/2004 | Scott et al. |
| 2004/0261383 A1 | 12/2004 | Schaerlund et al. |
| 2006/0086075 A1* | 4/2006 | Scott et al. ............... 55/498 |
| 2008/0190082 A1 | 8/2008 | Scott et al. |
| 2009/0049814 A1* | 2/2009 | Baseotto et al. ............. 55/482 |
| 2009/0094951 A1 | 4/2009 | Baseotto et al. |
| 2009/0100813 A1 | 4/2009 | Iddings et al. |
| 2009/0217632 A1* | 9/2009 | Coulonvaux et al. ......... 55/359 |
| 2010/0126131 A1* | 5/2010 | Scott et al. ............... 55/498 |
| 2010/0146917 A1 | 6/2010 | Coulonvaux et al. |
| 2010/0146920 A1 | 6/2010 | Iddings et al. |

FOREIGN PATENT DOCUMENTS

| | | |
|---|---|---|
| DE | 195 19 438 | 11/1996 |
| DE | 198 49 089 A1 | 4/2000 |
| EP | 0 230 991 A2 | 8/1987 |
| EP | 0 329 659 B1 | 8/1989 |
| EP | 0 480 991 B1 | 4/1992 |
| EP | 0 562 502 | 9/1993 |
| EP | 1 216 743 | 8/2000 |
| EP | 1 123 460 B1 | 8/2003 |
| EP | 1 174 171 B1 | 8/2004 |

| | | |
|---|---|---|
| EP | 1 357 997 B1 | 9/2006 |
| EP | 1 754 525 | 2/2007 |
| EP | 1 754 525 A1 | 2/2007 |
| FR | 2 665 217 | 1/1992 |
| GB | 1 125 335 | 4/1919 |
| GB | 1 124 735 | 8/1968 |
| GB | 1 499 922 | 2/1978 |
| GB | 1 511 904 | 5/1978 |
| GB | 2 110 110 | 6/1983 |
| GB | 2 119 674 | 11/1983 |
| GB | 2 163 368 | 2/1986 |
| SU | 868082 | 9/1981 |
| WO | WO 89/01818 | 3/1989 |
| WO | WO 98/11977 | 3/1998 |
| WO | WO 99/42719 | 8/1999 |
| WO | WO 00/23166 | 4/2000 |
| WO | WO 01/91884 | 12/2001 |
| WO | 02/45819 | 6/2002 |
| WO | WO 02/078816 A1 | 10/2002 |
| WO | WO 2004/039476 | 5/2004 |
| WO | WO 2005/092475 | 10/2005 |
| WO | WO 2006/026241 | 3/2006 |
| WO | WO 2006/119414 | 11/2006 |
| WO | WO 2007/009040 A1 | 1/2007 |
| WO | WO 2008/124437 | 10/2008 |
| WO | WO 2009/014982 | 1/2009 |
| WO | WO 2009/014986 | 1/2009 |
| WO | WO 2010/091917 | 8/2010 |

OTHER PUBLICATIONS

Pending Claims Corresponding to U.S. Appl. No. 12/218,822.

* cited by examiner

US 8,292,984 B2

AIR CLEANER ARRANGMENTS WITH END SUPPORT FOR CARTRIDGE; COMPONENTS; AND, METHODS

CROSS-REFERENCE TO RELATED APPLICATION

The present application includes the content of U.S. Ser. No. 61/072,162, filed Mar. 27, 2008, the complete disclosure of which is incorporated herein by reference. It also includes the disclosure of, with edits, U.S. Ser. No. 60/961,522, filed Jul. 20, 2007, the complete disclosure of which is incorporated herein by reference. A claim of priority is made to each of U.S. Ser. Nos. 60/961,522 and 61/072,162, to the extent appropriate.

In addition, the present application includes a scope overlapping features described in U.S. Ser. No. 60/961,521, filed Jul. 20, 2007 and 61/126,222, filed Apr. 30, 2008. The complete disclosures of each of 60/961,521 and 61/126,222 is incorporated herein by reference, and a claim of priority to each is made, to the extent appropriate.

FIELD OF THE DISCLOSURE

The present disclosure relates to air cleaners. It particularly concerns air cleaners in which the main filter cartridge includes an open end with an internally directed radial seal thereat, and a closed end. One member of a projection/receiver arrangement is positioned on the first end cap. Another member is included in a housing, for securely supporting the main filter cartridge.

BACKGROUND

Air cleaners are generally used to filter combustion intake air for internal combustion engines of a variety of vehicles and other equipment such as: trucks; buses; off-road construction equipment; agricultural equipment; generator sets; etc. Such air cleaners generally include a housing, an air flow inlet and an air flow outlet. A removable and replaceable main filter cartridge is positioned in the housing. The housing includes a service or access cover, for selected access to the internally received filter cartridge, for servicing. The filter cartridge is typically serviced by being removed and either: being replaced with a factory new cartridge; being refurbished and being re-installed; or, by being replaced with a previously used, but refurbished, cartridge.

Over the past 20 years, there has been a substantial of filter cartridges which are sealed to the housing with a radial seal, (either radially inwardly directed or radially outwardly directed.) Examples are described in U.S. Pat. No. 5,547,480; US 2006/0254229 A1; U.S. Pat. No. 6,652,614; WO 2007/022171 A1; U.S. Pat. No. 6,039,778; and U.S. Pat. No. 6,955,701, incorporated herein by reference. In some instances, with such cartridges, the end of the cartridge remote from the seal is supported against cantilevered motion. In such arrangements as U.S. Pat. No. 5,547,480, as shown in FIG. 2 of that reference, support is provided by a portion of the access cover surrounding the closed end of the cartridge remote from the seal. In such arrangements as U.S. Pat. No. 6,652,614, support is provided by a projection on the access cover extending internal of the end of the cartridge remote from the access cover. In WO 2007/009040 both are included.

Relatively recently, some arrangements have been developed to also inhibit rotational movement of the cartridge, once installed. Examples are described in WO 2007/009040 and WO 2007/022171.

Alternatives have been sought to obtain good support of the main cartridge, against cantilevered movement. Also, in some instances, it is desirable to provide for a non-rotatable mounting of the filter cartridge within the housing. Further it has been desirable to develop an air cleaner assembly arrangement in which an attempt to install an unapproved cartridge (incorrect cartridge) is readily recognizable.

SUMMARY

Examples of specific arrangements and features are described and shown. There is no specific requirement that an arrangement include all of the features characterized herein, to obtain some benefit according to the present disclosure.

In one aspect an air cleaner arrangement is provided which comprises an air cleaner housing and a serviceable air filter cartridge. The air cleaner housing includes an air flow inlet arrangement and an air flow outlet arrangement. The air cleaner housing defines an housing interior and comprises a housing body and an access cover.

The serviceable air filter cartridge is operably positioned within the housing interior. The air filter cartridge comprises a media pack extending between first and second end caps. The media pack surrounds and defines an open filter interior. The first end cap is an open end cap having an air flow aperture therethrough. The second end cap is typically a closed end cap having and outer end surface. The term "outer end surface" in this context refers to a surface facing generally away from the first end cap.

A housing seal arrangement is provided on the first end cap and is oriented for sealing to the air cleaner housing. The housing seal arrangement can comprise a radially directed seal. In an example shown, the housing seal is a radially inwardly directed seal.

A projection/receiver arrangement including first and second members is provided. One (e.g., a second) member of the projection/receiver arrangement is positioned on the access cover. It typically comprises a serpentine ring member, and can either be a ring projection or a ring shaped receiver groove. In the example depicted, the member of the projection/receiver arrangement, which is positioned on the access cover, comprises a serpentine receiving groove.

Another (i.e., first) member of the projection/receiver arrangement is positioned on the outer end surface of the end cap. It is engageable with the access cover, in a defined manner.

In general, the first and second members of the projection/receiver arrangement are engaged to provide cantilevered support of the air filter cartridge at the second end. Typically and preferably the first and second members of the projection/receiver arrangement are also engaged in a non-rotatable manner. By "non-rotatable manner" it is context, it is meant the engagement inhibits rotation of the filter cartridge with respect to the access cover (and thus the housing) once installation has occurred.

In an example provided, the second member of the projection/receiver arrangement is a groove receiver on the access cover, and the first member of the projection/receiver arrangement is an axial ring projection on the filter cartridge.

In an example depicted, the first member of the projection/receiver arrangement (i.e., the member on the filter cartridge) is a serpentine ring member comprising alternating convex and concave portions. In that example, the second member is a serpentine groove on the access cover.

In a specific example of an air cleaner assembly, as depicted, the assembly includes a housing including an air flow inlet arrangement and an air flow outlet arrangement;

and, comprises a housing body and an access cover; and, a serviceable filter cartridge operably positioned within the housing. The access cover includes, in an example depicted, a serpentine receiving groove therein. The cartridge includes a projection which extends into the serpentine receiving groove of the access cover. In a typical application, as a result of the shape of the serpentine groove on the access cover, the cartridge is supported against rotational motion and against cantilevered motion once installed.

Also disclosed are components for an air cleaner assembly, including, for example, a filter cartridge. An example filter cartridge is described which includes a projection on a closed end, that includes at least one arcuate section in which the at least one arcuate section is not a section of a curve corresponding to a circle extending around a center of the end cap. An example arrangement corresponding to this, is described.

BRIEF DESCRIPTION OF THE DRAWINGS

in FIG. 2 selected portions being shown in cross-sectional view, for inspection of interior detail.

in FIG. 10 selected portions are shown in cross-sectional view, for inspection of interior detail.

in FIG. 11, portions are shown in cross-section.

in FIG. 20 selected portions being shown in cross-sectional view, for inspection of internal detail.

DETAILED DESCRIPTION

I. Example Air Cleaner Assembly and Components; FIGS. 1-9

Figure 1:
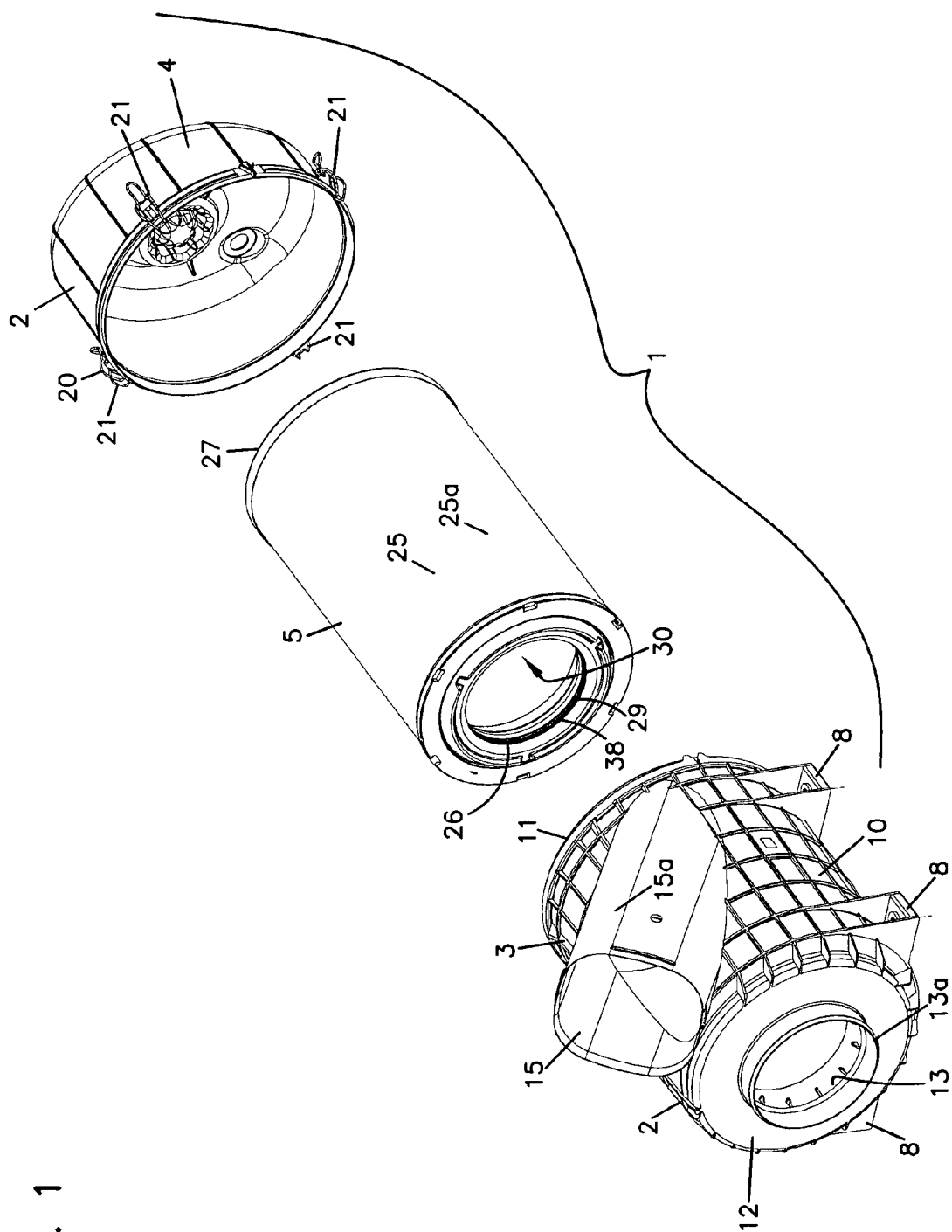
FIG. 1 is a schematic, exploded, perspective view of an air cleaner assembly according to the present disclosure.

The reference numeral 1, FIG. 1, generally indicates an air cleaner assembly according to the present disclosure. The air cleaner assembly 1 includes a housing 2 having a housing body 3 and an access or service cover 4. The assembly 1 includes a removable and replaceable, i.e., serviceable, filter cartridge 5.

Referring to FIG. 1, the housing 1 (in particular the housing body 3) includes mounting pads 8 thereon, for securement to framework of a vehicle or other equipment on which the air cleaner assembly 1 is secured, for use. A variety of orientations of mounting pads 8 can be used, within the principles of the present disclosure. In some arrangements instead of mounting pads formed integrally with the housing body, a mounting band arrangement can be used.

In general, the housing body 3 comprises a side wall 10 having a first open end 11 and opposite second end 12 with a first air flow passageway 13 thereat. The housing 2 further includes, in the example shown, second air flow passageway 15.

For the particular example shown, air flow passageway 13 is an airflow outlet passageway defined by outlet tube 13a; and airflow passageway 15 is an inlet air flow passageway defined by inlet tube 15a. It is noted that for the example shown, both airflow passageways 13a, 15a are located in the housing body 3. In some alternate applications to the principles described herein, one of the airflow passageways, for example inlet air flow passageway 15, can be located in access cover 4.

Further, for the example shown, airflow passageways 13a, 15a are each a single aperture. However, in alternate applications techniques herein, one or more of the passageways 13a, 15a can be defined by multiple apertures.

The air flow inlet 15 provides for passage of air to be filtered, into air cleaner 1. The particular air flow inlet 15 depicted, is positioned to direct that air through side wall 10.

In operation, the air filter cartridge 5 is inserted into the housing body 3 through open end 11. Access cover 4 is then fit over the open end 11 and cartridge 5, to close the open end 11. In an example shown, the housing 2 includes a closure arrangement 20 comprising a plurality of latches 21. Access cover 4 is secured in place on the housing end 11 by the closure arrangement 20. In the particular example air cleaner arrangement 1 depicted, closure arrangement 20 (comprising latches 21,) is mounted on the access cover 4 for selected engagement with the housing body 3. It is noted that in some alternate applications of the techniques described herein, latches 21 can be positioned on the housing body 3 for engagement with the access cover 4.

Still referring to FIG. 1, the cartridge 5 generally comprises a media pack 25 extending between first and second opposite end caps 26, 27. In a typical arrangement, end cap 27 will be a closed end cap, i.e., it has no apertures therethrough, through which air can flow. End cap 26, however, will typically be an open end cap, including central open air flow aperture 29 therethrough and around which the media pack 25 extends.

The media pack 25 can include media 25a selected from a variety of types of media. The media pack 25 may, for example, comprise pleated media, although alternatives are possible. In many arrangements, the media pack 25 will be provided with one or more of inner and outer support liners for the media 25a. Such support liners can, for example, comprise plastic arrangements, expanded metal arrangements or porous metal arrangements.

In a typical media pack 25, the media 25a surrounds and defines an open interior 30. The aperture 29, in the first end cap 26, is generally in air flow relationship with the open interior 30. By "air flow relationship" in its context, and variants thereof, it is meant that the aperture 29 opens into the interior 30, and air can flow between the two without passage through the media pack 25.

It is noted that the techniques described herein can be applied and used with, in addition to the primary filter cartridge 5, a secondary or safety filter cartridge. The example depicted in the figures does not show a safety cartridge. However, a safety cartridge can be positioned internally of an interior 30. This would require the air, once though the media 25a, to pass through the safety cartridge before exiting the housing 2, through airflow exit 13.

A typical media pack 25 can be provided in a variety of shapes, for example it can be cylindrical, or have a conical taper to it. When the media pack 25 has a conical taper, in a typical application, the taper will be downwardly (inwardly) from end cap 26 toward end cap 27. The typical conical angle (taper inward) when used, would be at least about 0.5 degrees usually at least 1.0 degree and often within the range of 1.0-6.0°, including, although alternatives are possible.

The particular air cleaner assembly 1 depicted, is configured for "forward" flow. By "forward" in this context, it is meant that air, during filtering, generally flows through media pack 25 from exterior into the open interior 30 (sometimes referred as out-to-in flow.) Thus, when air cleaner assembly 1 is operated, air to be filtered flows through inlet 15, into an annulus 35 (FIG. 2) within housing 2 (and access cover 3) that extends around the filter cartridge 5. The air then passes through the media pack 25 into open interior 30. The air then passes from the cartridge 5 through open end 29, and leaves the air cleaner through inlet air flow outlet 13.

In those instances in which a safety filter is used, the air from the main filter cartridge 5 would pass through the safety filter, after passage through cartridge 5 and before exit through the outlet 13.

Many of the principles described herein can be applied with "reverse flow" or "in-to-out flow" arrangements, in which air, during filtering, passes from interior 30 through the media pack 25, to an exterior location.

In typical operation, the housing body 3 is secured to the equipment such as a truck, with which the air cleaner 1 is used, and the access cover 4 is separable from the main body 3, for service access to cartridge 5.

In general, cartridge 5 includes a housing seal arrangement 38 on end cap 26, sealed into a portion of the housing 2, when cartridge 5 is installed.

Referring to FIG. 1, it is noted that the housing 2 (comprising body 3 and access cover 4) is configured for each of the two components to be molded from a plastic, for example a glass filled polypropylene. The principles described herein are particularly adapted for plastic arrangements, however they can be utilized when one more of the components 3,4, or portions of the components 3,4 comprise sheet metal.

Figure 2:
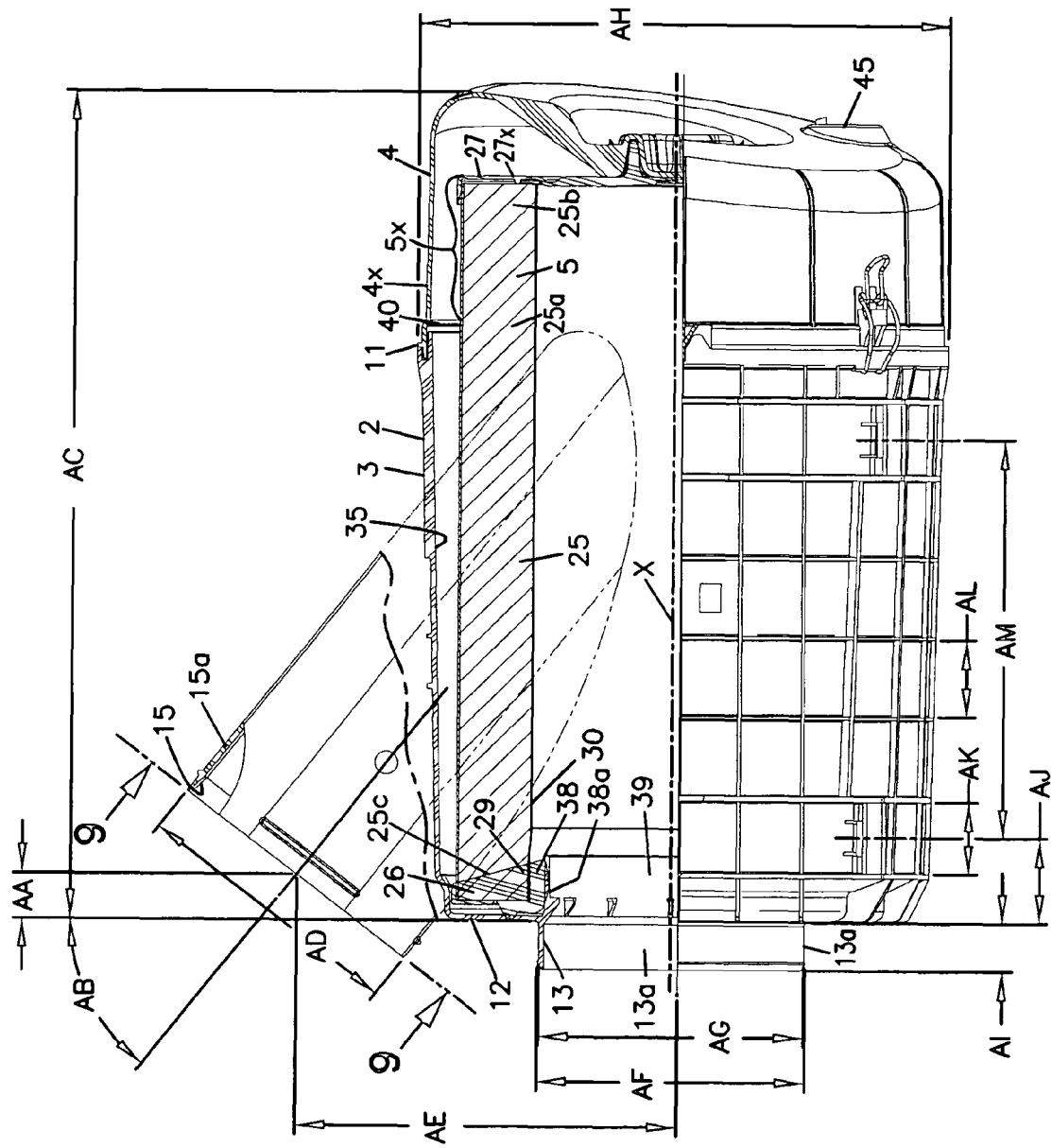
FIG. 2 is a schematic side elevational view of the air cleaner depicted in FIG. 1.

Attention is now directed to FIG. 2. In FIG. 2 a side elevational view of air cleaner assembly 1 is depicted. In FIG. 2, air cleaner assembly 1 is shown with access cover 4 secured to housing body 3. Also in FIG. 2, a portion of air cleaner assembly 1 is depicted in cross-section, so that internal detail can be viewed. Referring to FIG. 2, air flow annulus 35 around cartridge 5 is viewable. The example air flow annulus 35 extends completely radially around cartridge 5, for distribution of air to be filtered around the cartridge 5, during operation.

Referring to FIG. 2, end cap 26 is viewable in cross-section. In general, cartridge 5 includes a housing seal arrangement 38 on end cap 26, sealing a portion to the housing 2 when cartridge 5 is installed. The end cap 26, for the specific example shown, defines a radial seal portion 38a around opening 29. The radial seal portion 38a is generally oriented to form an inwardly directed radial seal against an outer surface of tube 39, when cartridge 5 is installed. Such inwardly directed radial seal arrangements are described, for example, in U.S. Pat. Nos. 5,547,480; 6,652,614; WO 2007/022171; U.S. Pat. Nos. 6,039,778; and, 6,955,701. It is noted that a variety of alternate housing seal arrangements locations and configurations can be used in the cartridge 5 and the housing 3 according to the present disclosure. Outwardly directed radial seals, for example, can be used, although still further alternatives are possible.

A variety of specific arrangements can be utilized to form inwardly directed radial seal portion 38a. In a typical arrangement, the end cap 26 will be a molded-in-place end cap comprising a foamed polyurethane such as those described in U.S. Pat. No. 6,955,701. Such materials can be formed, during the molding process, to define radial seal portion 38a in aperture 29.

Still referring to FIG. 2, it is noted that for the particular example air cleaner assembly 1 depicted, the cartridge 5 is sufficiently long to project into the access or service cover 4. For example, referring to FIG. 2, portion 5x of cartridge 5 extends beyond the housing body 3 into the access cover 4. In a typical example, this extension would be at least 30 mm and typically within the range of 40-75 mm, inclusive, of cartridge length between the end caps 26 and 27. The principles described herein, however, can be applied in arrangements in which a separation line (indicated at 40, FIG. 2), between the access cover 4 and the housing body 3 is located beyond end cap 27, in a direction away from end cap 26.

Referring to FIG. 2, it can be seen that the air filter cartridge 5 when installed, is secured at end cap 26 around tube 39, and is supported at this location. At the opposite end, i.e., the cartridge end where end cap 27 is located, the cartridge 5 should be supported, or the air filter cartridge 5 will be cantilevered with respect to the housing tube. Support to the cartridge 5 from the housing 2 at end cap 27, which prevents undesirable levels of cantilevered movement will be referred to as "cantilevered" or "cantilever end" support, or by similar terms. Herein, cantilevered support is provided at end cap 27, by engagement between a portion of the access cover 4 and a portion of the end cap or cover 27, as discussed below.

In more general terms, a projection/receiver arrangement is provided with one member on end cap 27 and another member on access cover 4, providing for an engagement in a manner which inhibits cantilevered motion of cartridge 5 at end cap 27.

Referring to FIG. 2, the media 25a can be seen as having opposite ends 25b, 25c; end 25b being adjacent end cap 27 and end 25c being adjacent end cap 26. Media 25a and thus the cartridge 5, is supported at end 25c by the insertion of tube 39 into end cap 26. However end 25b, remote from end 25c is cantilevered. Herein "cantilevered motion" and variants thereof, is meant to refer to movement (not rotational) that could occur at end 25b, remote from tube 39, if end cap 27 is not appropriately supported. The particular motion referenced, with respect to cantilevered motion, is a vibrational movement, i.e., not a rotational movement. Cantilevered motion, then, would be up and down movement of media end 25b, or back and forth movement of media end 25b, or some combination thereof.

In general terms, then, cantilevered support is support of cartridge 5 against undesirable levels of cantilevered motion. That is, the effort is not necessarily to prevent any vibrational movement, but only to inhibit movement beyond some acceptable level.

The engagement at end cap 26, for the example air cleaner assembly depicted, is a circular, inwardly directed, radial seal. Thus, it is radially symmetric, and subject to potential rotation of the cartridge 5 around tube 39. Support at end cap 27 through engagement between the end cap 27 and the access cover 4 (in a form described herein) also inhibits relative rotational motion of the cartridge 5, relative to access cover 4, once installed. Since the access cover 4 is secured in place on the body 3, this inhibits rotation of end cap 26 around tube 39, once cartridge 5 is installed.

An engagement between the access cover 4 and the cartridge 5 that inhibits undesirable levels of rotational movement of one relative the other will be referred to herein as "non-rotatable" engagement. Again, since the access cover 4 is generally non-rotatably secured in place in the housing body 3, by arrangement 20, a non-rotatable engagement between the access cover 4 and the cartridge 5 inhibits the cartridge 5 from rotating about tube 39 once installed.

Still referring to FIG. 2, access cover 4 includes an ejection port 45 therein. Water and/or dust can be ejected through port 45, during operation. Typically, air cleaner 1 is installed with dust and water ejection port 45 angled downwardly.

Referring again to FIG. 2, it is noted that the access cover 4 includes no projection or shield, extending axially therefrom (toward end 12 of body 3,) and spaced inwardly from side 4x which also surrounds the cartridge 5. The absence of such a shield facilitates flow of air around end 27 and direction of dust and water toward evacuation outlet 45. It also means the no portion of the media at 25 is covered up, from flow therearound.

Alternately stated, access cover 4 includes an outer rim 4x which engages body 3, when access over 4 is mounted. The rim section 4x, FIG. 2 is the only portion of the access cover 4, in the example shown, which surrounds an outer side portion of the media pack 25.

Still referring to FIG. 2, it is also noted that for the particular example cartridge 5 depicted, no portion of end cap 27 projects into interior 30 a substantial amount; a substantial amount in this context meaning a projection of 10 mm or more. Thus, for the specific example shown there is no structure projecting 10 mm into the cartridge interior 30 around which the media pack 25 extends.

In FIG. 2, example dimensions for the example air cleaner arrangement depicted are provided as follows: AA=31.9 mm; AB=52°; AC=582 mm; AD=190 mm; AE=263.6 mm; AF=184 mm; AH=366 mm; AG=182 mm; AI=34 mm; AJ=60 mm; AM=280 mm; AK=50.5 mm; and AL=54 mm. Other dimensions can be estimated from scale.

Of course the dimensions are merely meant to indicate a useable example arrangement. Alternate dimensions and arrangements can be utilized, with principles according to the present disclosure.

Figure 3:
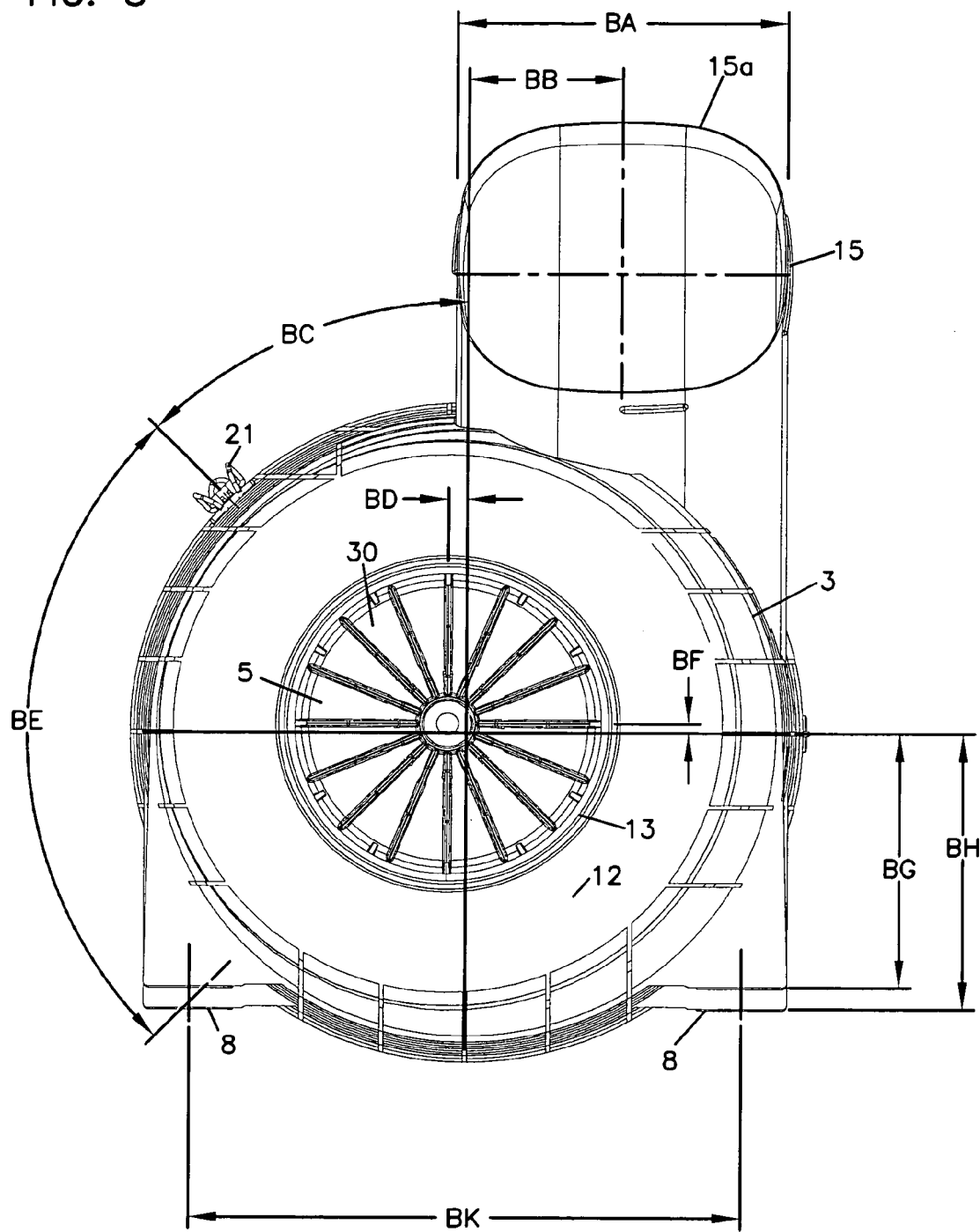
FIG. 3 is a schematic, enlarged, outlet end elevational view of the assembly depicted in FIGS. 1 and 2.

Attention is now directed to FIG. 3. In FIG. 3, an end elevational view of air cleaner assembly 1 is depicted. In FIG. 3, the view is directed toward housing end 12 and outlet 13. Here, pad arrangement 8 for securing the housing 2 to place on equipment is also viewable.

In FIG. 3, one can view through tube 13 into interior 30 of cartridge 5.

In FIG. 3, example dimensions of the air cleaner assembly 1, FIGS. 1-3, are indicated as follows: BA=180 mm; BB=83.5 mm; BC=45°; BE=90°; BK=300 mm; BG=141 mm, BH=153 mm, BD=D 10 mm, and; BF=5 mm.

Referring again to FIG. 2, for the particular cartridge 5 depicted, end cap 27 comprises a closed end cap, having no aperture therethrough, and extending across end 25b of the media pack 25; an opposite end 25c of media pack 25 being embedded in end cap 26. For a typical arrangement, although alternatives are possible, end cap 27 will comprise a preformed piece, to which media pack 25 is potted with an adhesive or sealant material. Typically, end cap 27 will comprise a preformed plastic material, such as an ABS potted with a hard polyurethane.

Alternately stated, (and as previously discussed) in a typical application end cap 26 will be molded-in-place from a resin appropriate to form a soft, compressible, structure, i.e., the media pack 25 will be inserted into the material of end cap 26 as the material hardens and is molded to the designed shape. While this is not required, it will be typical for any applications of the present principles.

End cap 27, in contrast, is typically molded first from a material appropriate to form a rigid plastic, part and is then attached to end 25b for example with a potting adhesive. Although alternatives are possible, this will be typical and convenient.

Figure 4:
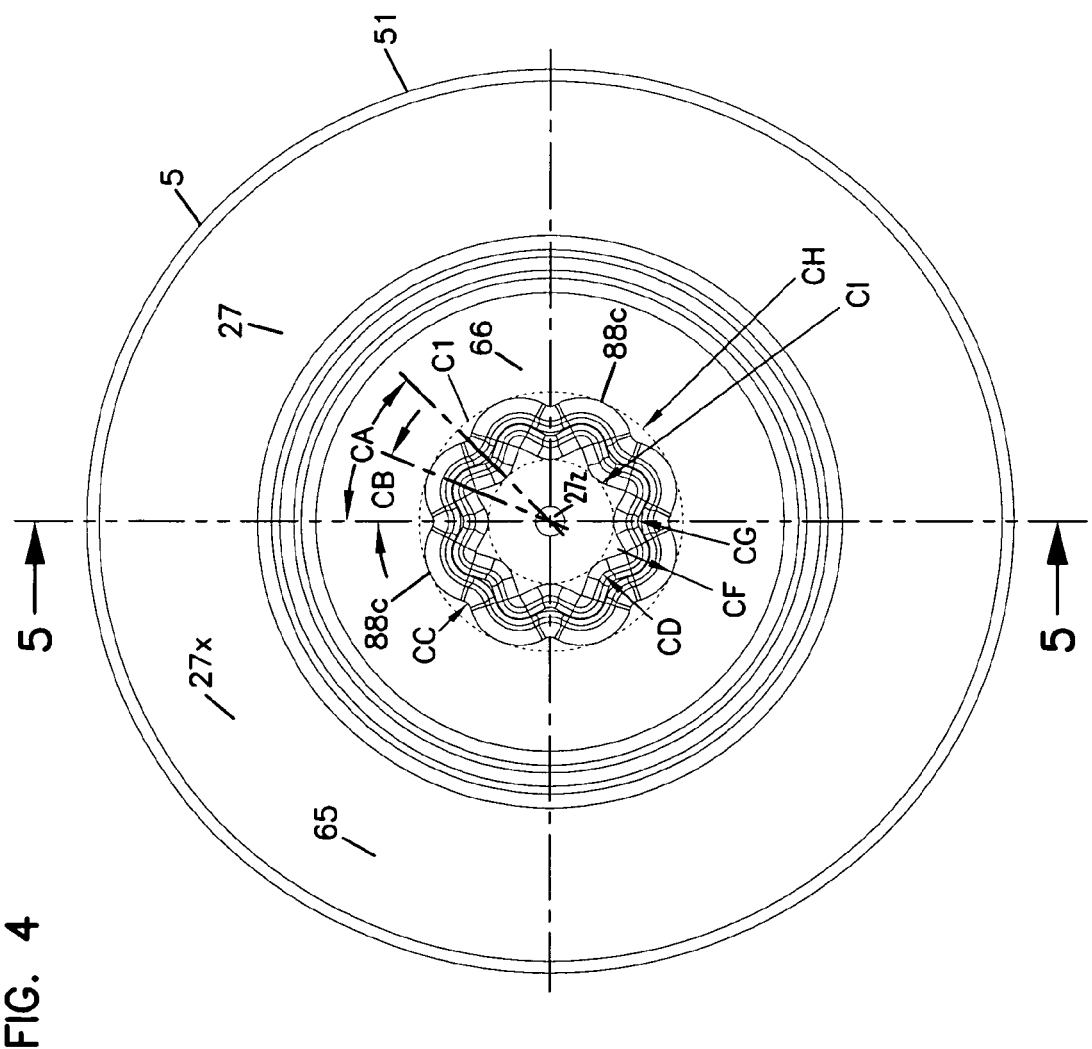
FIG. 4 is a schematic outside end view toward a second, closed, end cap of a primary filter cartridge assembly of FIGS. 1-3.

In FIG. 4, an end view of cartridge 5 is provided. The end view of cartridge 5 is taken directed toward end cap 27. Thus, the structural surface viewable in FIG. 4 is exterior surface 27x of end cap 27, FIG. 2.

In FIG. 4, example dimensions and angles are follows: CA=45°; CB=22.5°; CC=3.3 mm radius; CD=5.4 mm radius;

CF=16.8 mm radius; CG=3.5 mm radius; CI=41.6 mm diameter; and, CH=87 mm diameter.

Figure 5:
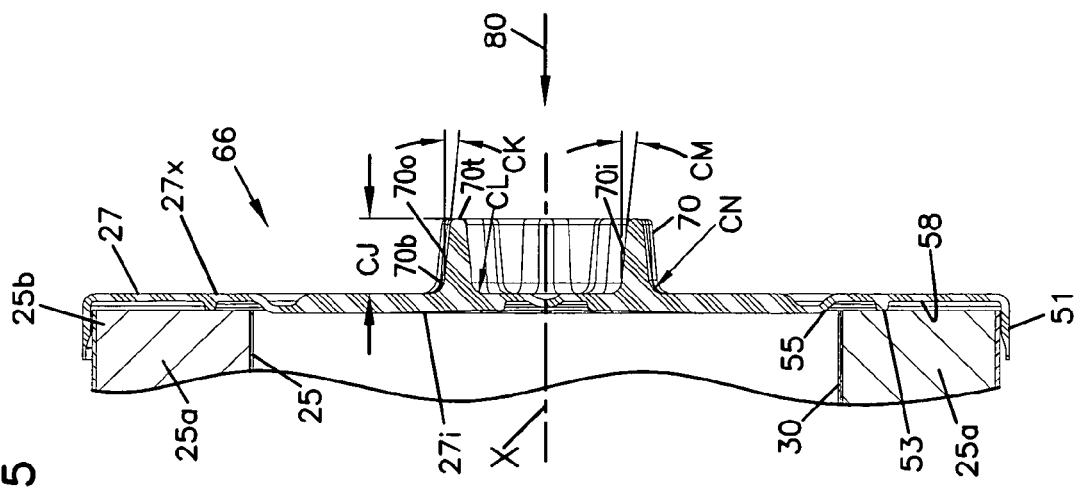
FIG. 5 is a fragmentary, schematic, cross-sectional view taken generally along line 5-5, FIG. 4.

In FIG. 5, a cross-sectional view is taken along line 5-5, FIG. 4. Here both exterior surface 27x and interior surface 27i are viewable in end piece 27.

FIG. 5 is a fragmentary cross-sectional view. End 25b of media pack 25 is viewable in fragmentary view.

Referring to FIG. 5, end cap 27 includes an outer rim 51. The outer rim 51 fits around (circumscribes) the media pack 25. Along interior surface 27i, end piece 27 includes a rib 53. Rib 53 operates as a media standoff, during assembly. That is, when the media pack 25 is fit within end 51, the media pack 25 abuts rib 53 during potting.

Projection 55 forms an inside of a containment ring for the media pack 25 and potting material (the outside containment provided by rim 51). That is, during assembly of cartridge 5, the media pack 25 is positioned with end 25b thereof oriented between rim 51 and inner projection 55. A potting material is positioned at this location, to secure end piece 27 in place on the media pack 25. Stand off rib 53 will ensure that the sealing or potting material can seal between end 27b of the media pack 25, and perimeter ring portion 58 of inner surface 27i.

Previously it was discussed that in a typical arrangement, although alternatives are possible, there is no projection extending substantially into interior 30, from end cap 27. It can be seen that projection 55 is relatively small, and does not extend 10 mm into interior 30.

Referring to FIG. 4, end surface 27x, then, includes an outer ring section 65 in overlap with media pack 25 in cartridge 5. Outer surface 27x further includes an inner central, portion 66, surrounded by outer ring 65. The central portion 66, in the cartridge 5, FIG. 2, is not in axial overlap within media pack 25, but rather overlaps the interior region 30 that is surrounded by the media pack 25.

Referring to FIG. 4, region 65 and rim 51 can be viewed as having a circular orientation around center 27z of end cap 27.

In general, herein a projection/receiver arrangement is provided for engagement between the cartridge 5 and the access cover 4. In particular, the projection/receiver arrangement depicted provides for engagement between the cartridge end cap 27 and the access cover 4, in a manner that supports the cartridge 5 against undesirable levels of cantilevered motion at end cap 27; and, inhibits relative rotational motion between the cartridge 5 and the access cover 4 (and thus between the cartridge 5 and the outlet tube 39 in air cleaner assembly 1).

In general terms, the projection/receiver arrangement includes a projection member on a first one of cartridge 5 and access cover 4; and, receiver member on another one of the access cover 4 and cartridge 5. For the particular example depicted, the projection/receiver arrangement includes a projection (first) member arrangement on the cartridge 5, and a receiver (second) member arrangement on the access cover 4; however, alternatives are possible.

Referring to FIG. 5, the central portion 66, of end cap outer surface 27x, includes thereon projection arrangement 70. In general terms, the projection arrangement 70 projects from a remainder of end cap 27, in a direction away from the end 256 of media pack 25; i.e., in a general direction away from opposite end cap 26. The distance of projection 70 indicated at dimension CJ, FIG. 5, is typically at least 10 mm, usually at least 15 and often within the range of 20 to 40 mm. In the example depicted, the dimension CJ is 25 mm.

The direction of projection 70 is generally axial, i.e., in the direction corresponding to the general direction of central axis X, FIG. 2 and away from end cap 26. By "axial" in this context, it is not meant that the projections of outer and inner surfaces 70o, 70i of projection 70 are necessarily precisely parallel to axis X. Indeed each can be angled from axis X somewhat.

Typically outer surface 70o slants inwardly, along a direction of extension from an adjacent region of end cap 27; and, inner surface 70i slants outwardly along its direction of extension from an adjacent region of end cap 27. This angle of slant inwardly of surface 70o is indicated at CK, and is generally within the range of 3-7°; inclusive. The corresponding angle of extension outwardly surface 70i is indicated at CM and typically within the range of 3-7°; inclusive. In the example depicted, FIG. 5, CK and CM are each 5.6°.

Angles to surfaces 70o, 70i of the type indicated, provide the projection 70 with an axially outermost tip 70t, which is narrowed somewhat relative to a base region 70b of projection 70. A somewhat narrow tip 70t facilitates insertion into a receiver arrangement, described below, on access cover 4.

Figure 5A:
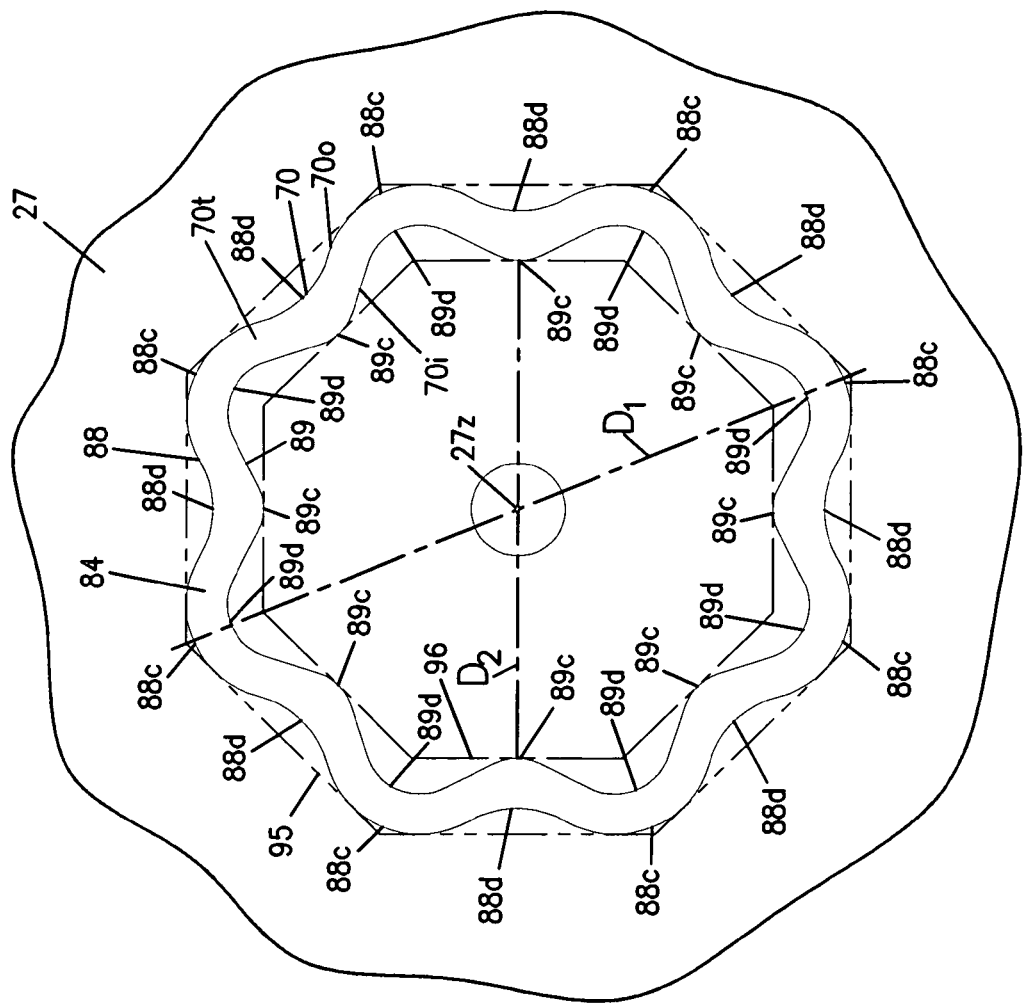
FIG. 5A is a schematic, fragmentary, enlarged, view of a portion of the surface depicted in FIG. 4.

Attention is now directed to FIG. 5A, a schematic, fragmentary, plan view of projection arrangement 70 taken in a general direction of arrow 80, FIG. 5. It is noted that in FIG. 5A, the schematic depiction provides the general shape of projection 70 in plan view, and does not account for a slant to sides 70o, 70i.

Referring to FIG. 5A, although alternatives are possible, the particular projection arrangement 70 depicted comprises a continuous wall 84. By "continuous" in this context, it is meant that there are no gaps in the wall 84 with respect to extension around the perimeter defined by the wall 84; i.e., around center 27z.

Also, although alternatives are possible, the wall 84 is completely "closed." By this it is meant that the wall 84 includes no apertures therethrough, in its continuous extension.

Referring to FIG. 5, the cross-section, it is also noted that for the particular example depicted, the projection 70 is "solid" throughout; i.e. does not have a hollow interior between surfaces 70o, 70i. This will be typical and convenient.

The projection arrangement 70 generally has a minimum largest external dimension thereacross, corresponding to dimension $D_1$, FIG. 5A of at least 35 mm and often within the range of 40 to 100 mm. A reason for this is that it facilitates engagement with the access cover 4, in a typical preferred arrangement.

The particular wall 84 depicted surrounds an open and recessed interior surface section 85. This section typically has a smallest internal dimension access shown at $D_2$, of at least 15 mm typically at least 20 mm and often within the range of 30 to 90 mm.

Typically, projection 70 is configured around center 27z such that the minimum largest dimension thereacross indicated at $D_1$, can be measured in at least two directions at right angles to one another; i.e., $D_1$ indicated in FIG. 5a would also indicate a minimum largest dimension in a direction perpendicular to line $D_1$. Further, typically the configuration of the objection 70 is such that the smallest inside dimension thereacross, indicated at $D_2$, is met in two directions, the first direction being for example as indicated at line $D_2$, and a second dimension taken perpendicular to the first dimension.

Typically the projection 70 has a depth of extension from its tip 70t over a distance of at least 6 mm (and typically at least 12 mm) in which the thickness of projection 70 does not exceed 10 mm, but is typically at least 4 mm (discounting tapering at the very tip.) This would be for example a width between walls 70i, 70o, extending inwardly from tip 70t at least a depth of 25% and typically at least 35% of its extent of projection. Of course near the base 70*b*, FIG. 5, projection 70 may thicken (widen) somewhat.

The particular, closed, continuous wall 84 depicted, has a serpentine outer surface 88 and a serpentine inner surface 89, corresponding to surfaces 70*o*, 70*i* respectively. By "serpentine" in connection with the outer surface 88, it is meant that extension around center 27*z*, outer surface 88 does not define a series of straight lines or even a circle, but rather a series of alternating inner and outer curves. For the example shown serpentine surface 88 comprises a plurality of radially outwardly facing convex sections 88*c*, and a plurality of radially outwardly facing concave sections 88*d* alternating with one another.

Referring to outer surface 88, the reference to a "radially outwardly facing convex section 88*c*" is meant to refer to a section of surface 88 which curves outwardly; and the reference to "radially outwardly facing concave sections 88*d*" is meant to refer to a section of surface 88 which curves inwardly.

Analogously, radially inwardly facing inner surface 89 is also serpentine, comprising a plurality of radially inwardly facing convex sections 89*c* and radially inwardly facing concave sections 89*d*, alternating with respect to one another, as the inner surface 89 extends around center 27*z*. For the example depicted, each concave section 89*d* of inner surface 89 corresponds with, and aligns radially with, a convex section 88*c* of outer surface 88; and, each convex section 89*c* of inner surface 89 is aligned radially with concave section 89*d* of outer surface 88.

For the particular example shown, wall 84 defines, in each of the outer surface 88 and inner surface 89, eight concave sections and eight convex sections. Further: (a) a curvature of each convex 88*c* section of surface 88 is the same as each other convex section 88*c* in surface 88, and, (b) a curvature of each concave section 88*c* is the same as each other concave 88*d*. The same is true for each cover section 89*c* and each concave section 89*d*. The result is a regular "petal" shape to projection 70. By the term "petal" in this context, it is meant that when viewed in plan view, the projection 70 can be seen to have a plurality of outwardly projecting petals, i.e., curved sections. By the term "regular" in this context, it is meant that each outwardly projecting petal has the same shape as each other outwardly projecting petal. Referring to FIG. 5A, it is also noted that the center of each convex section 88*c* in the outer surface 88, for the example shown, can be seen to define a vertex of an octagonal shape, indicated at phantom lines at 95. Further, each center point of each concave section 89*c* in surface 89 can be seen to define a center point in a side of an internally positioned octagon depicted in phantom lines at 96. The octagons 95, 96 are radially aligned, one spaced from the other.

In more general terms, serpentine projection 70 comprises a plurality of outward convex petal sections and inward concave sections, providing for a serpentine extension of wall projection 70 around center 27*c*.

Typically, for reasons discussed below, the curvature of each outwardly directed convex section 89*c* is such as to have a smaller radius of curvature than a hypothetical curvature of such a section if directed on, or positioned on, a circle centered on center 27*z*. This is apparent by referring to FIG. 4 and comparing the curvature of circle C1 to the curvature of outer convex sections 88*c*.

Referring to FIG. 5, the indicated dimensions are as follows: As previously discussed, CJ=25 mm; CK=5.6°; and CM=5.6°. In addition, CL=4 mm radius; and CN=5 mm radius.

Figure 7:
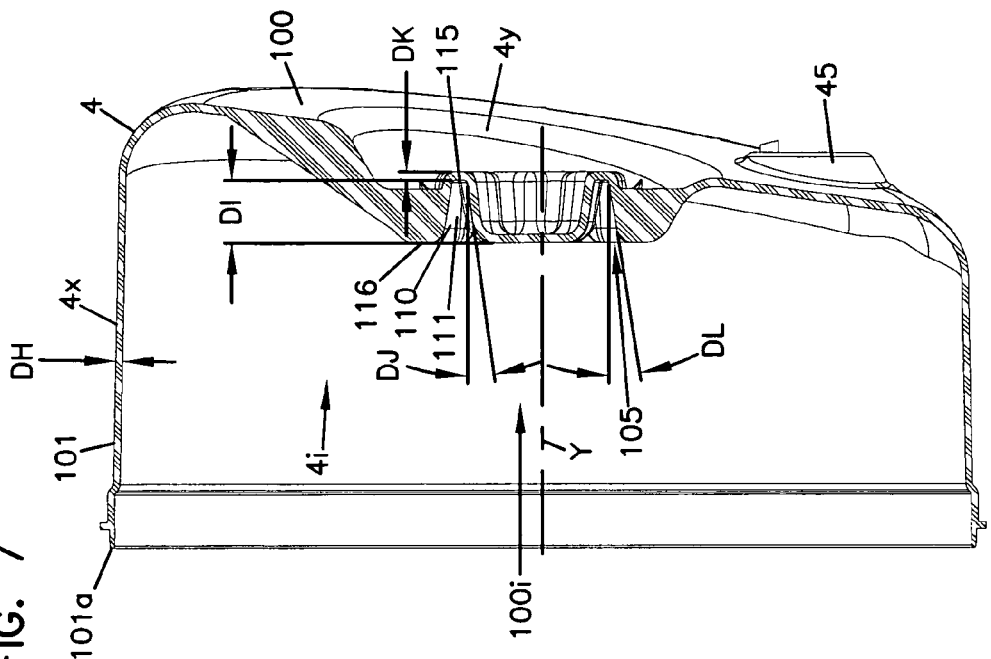
FIG. 7 is a schematic cross-sectional view taken along line 7-7, FIG. 6.
Figure 6:
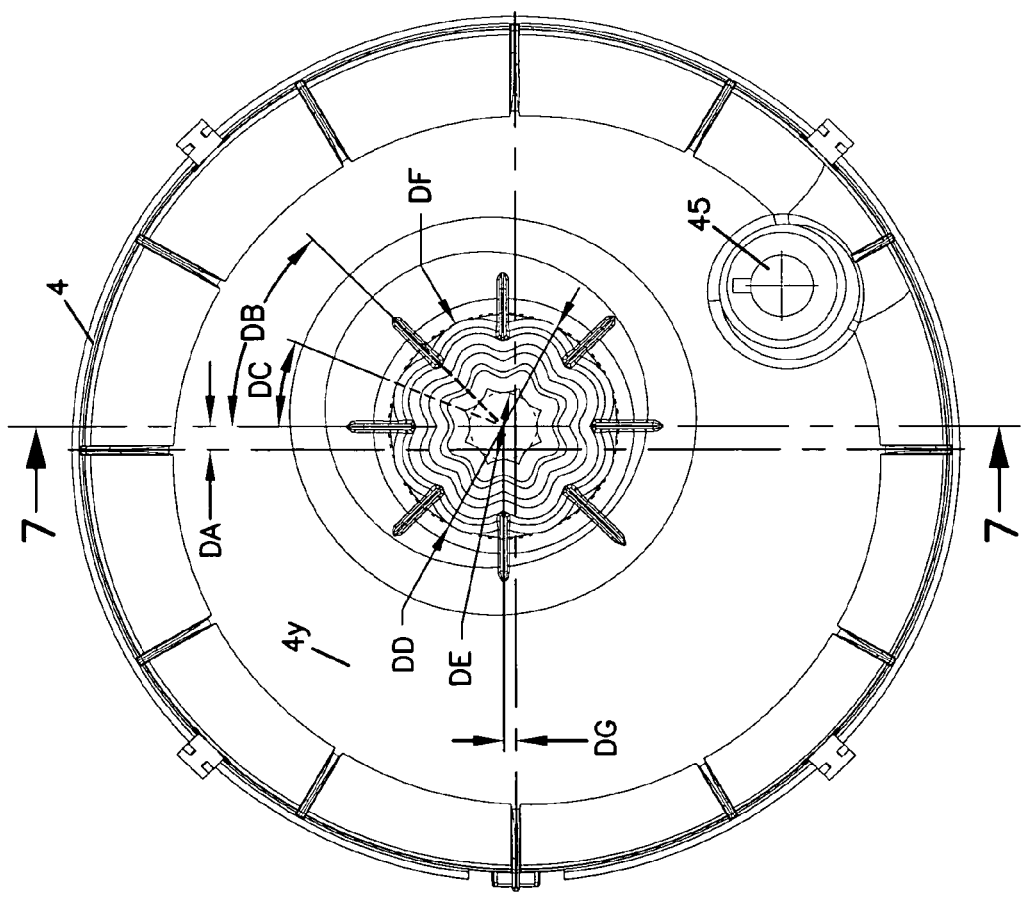
FIG. 6 is a schematic outside end elevational view of an access cover component of the assembly of FIGS. 1-3.

Attention is now directed to FIGS. 6 and 7, in which portions of access cover 4 are viewable. It is noted that in FIGS. 6 and 7, access cover 4 is depicted without closure arrangement 20 thereon, for convenience.

Referring to FIG. 6, the view of access cover 4 depicted is generally toward exterior surface 4*y*. In FIG. 7, a cross-sectional view taken along line 7-7, FIG. 6 is viewable.

Referring to FIG. 7, access cover 4 generally includes end wall 100 and side wall 101; side wall 101 corresponding to side wall 4*x*, FIG. 2. Side wall 101 includes open end 101*a* positioned and sized for engagement with housing body 3, FIG. 1. Side wall 101, for the example shown, is sized to surround a portion of cartridge 5, to, during assembly. Central section 100 is a central, end, section of access cover 4 that includes water/dust ejector port 45 therein. In use, the port 45 would typically be provided with a valve member.

Still referring to FIG. 7, access cover 4 includes an interior surface 4*i* with a central region 100*i*. Central region 100*i* includes thereon a second member 105 of a projection/receiver arrangement. The second member of the projection/receiver arrangement 105 is sized, configured and positioned for selective engagement with a first member of a projection/receiver arrangement, on cartridge 5.

The particular air cleaner assembly 1 as discussed so far, the cartridge 5 includes a projection 70 of a projection/receiver arrangement thereon. Therefore, the access cover 4 includes a receiver member 110 thereon, positioned for engagement with projection member 70.

Referring to FIG. 7, receiver member 110 defines a receiver groove 111 in cover interior surface 4*i*. The receiver groove 111 generally extends around a central axis Y on access cover 4. It is noted that for the particular example, groove 111 is not centered around line Y, but rather is eccentrically positioned relative thereto.

Figure 7A:
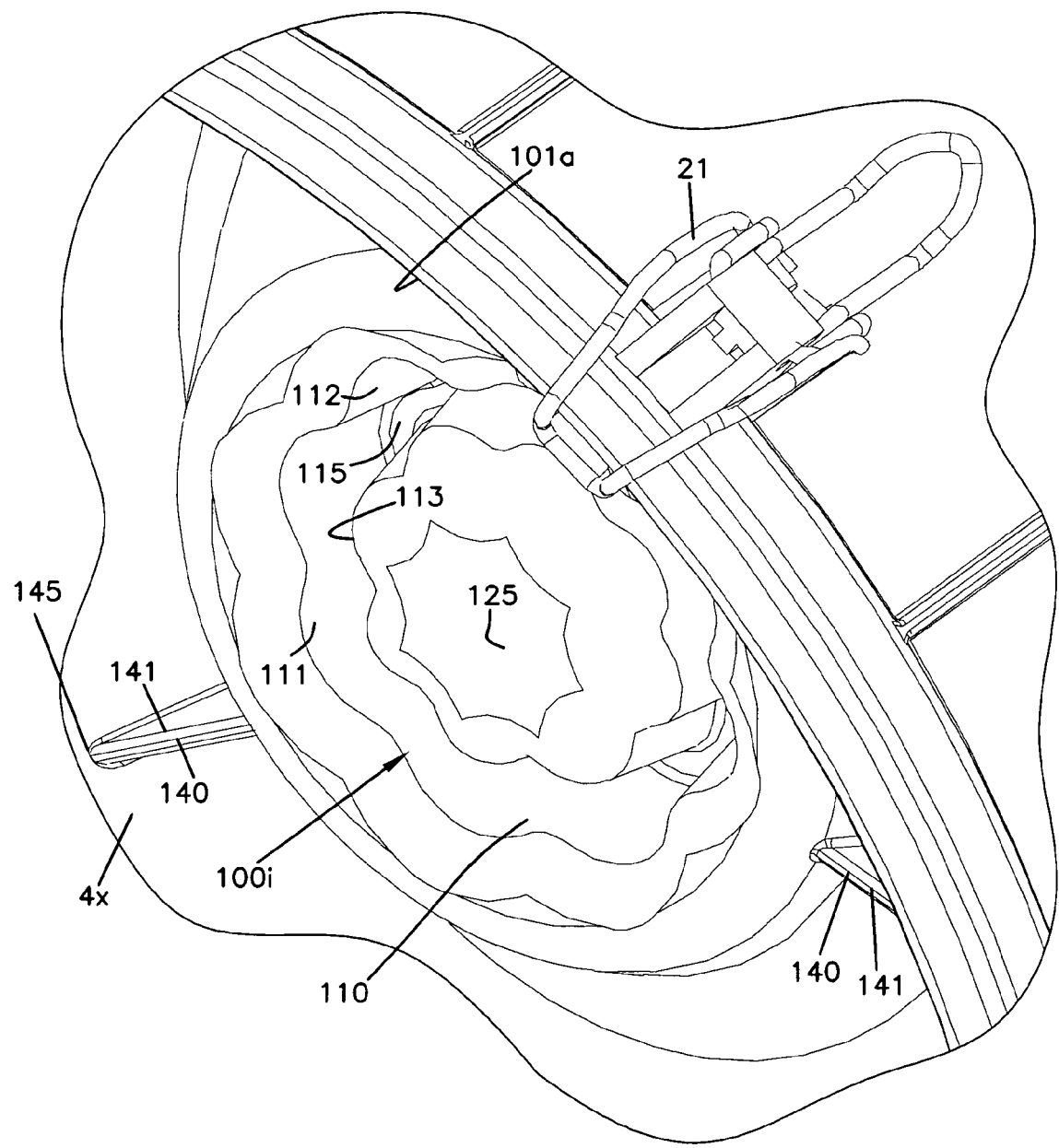
FIG. 7A is an enlarged, schematic, fragmentary, perspective view of the selected portion of the inside surface of the access cover, depicted in FIG. 6; the enlargement being of a portion of FIG. 1.

In FIG. 7A, a fragmentary schematic, perspective, view of receiver groove 111 is depicted. The groove 111, FIG. 7A, is depicted in a view corresponding to an enlarged portion of FIG. 1.

Referring to FIG. 7A, receiver groove 111 defined between an outer wall 112 and an inner wall 113. The example receiver groove 111 depicted is continuous. By "continuous" in this context, it is meant for the particular example depicted, the groove 111 extends around a center 125, FIG. 7A, in a continuous uninterrupted path; i.e., the groove 111 does not includes any barriers or blockages therein, in its extension.

Figure 7B:
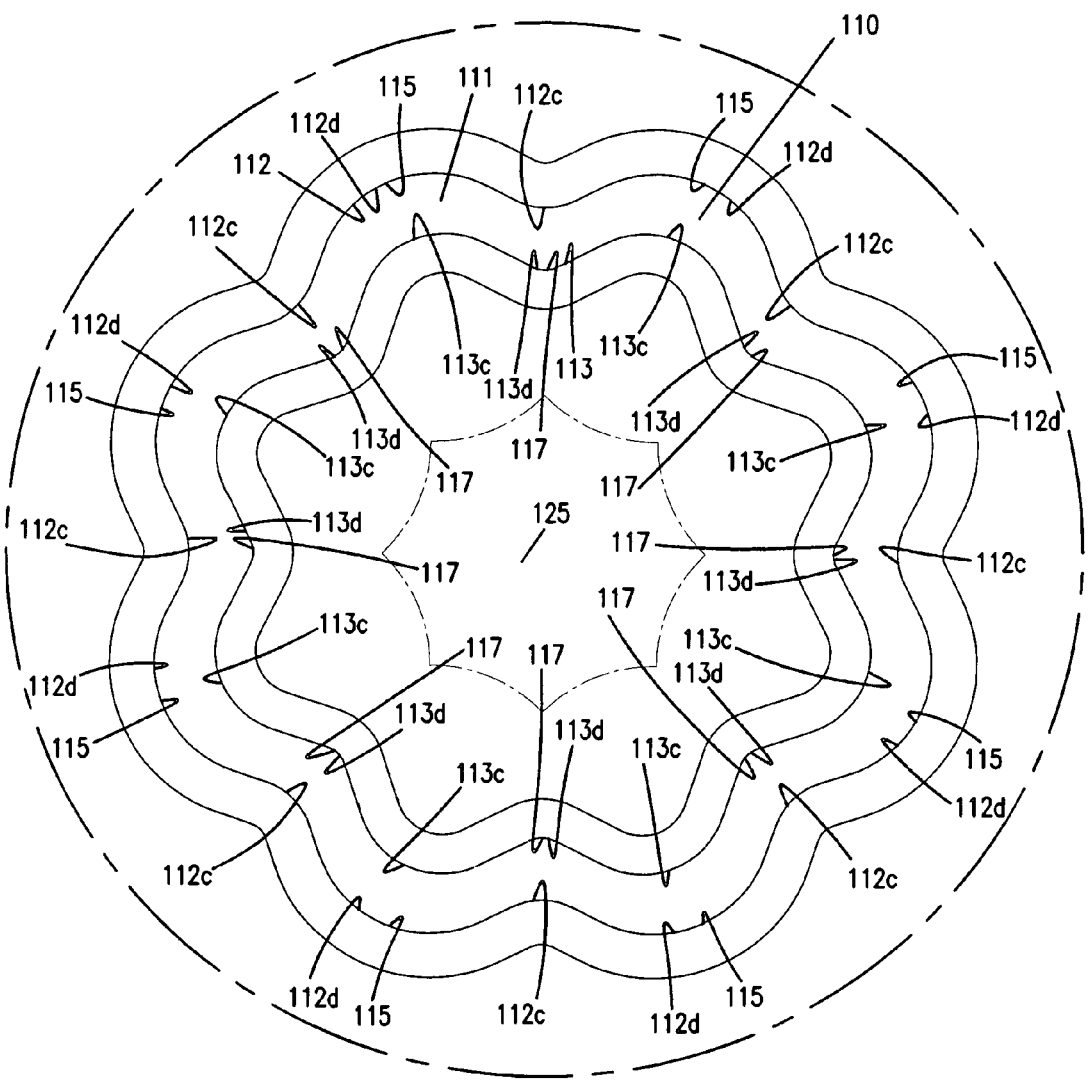
FIG. 7B is an enlarged schematic, fragmentary view of a selected portion of FIG. 7A, shown in plan view.

Attention is now directed to FIG. 7B. FIG. 7B is a schematic plan view of groove 111. The schematic plan view of FIG. 7B does not show the tapering of the side walls, but otherwise shows the general shape.

The particular receiver groove 111 is serpentine in shape, having convex sections 115 and concave sections 117, alternating with respect to one another. Herein reference to a "convex" section in this context, is meant to refer to an outward bow or bend relative to center 125, and a "concave" section is meant to refer to an inward bend or projection toward center 125. Of course an outwardly directed "concave" section could be characterized as an inwardly directed convex section.

Analogous to projection 70, in a typical arrangement the curvature of convex sections 115 is generally selected, so as not to rest on a circle surrounding a center 125 of the receiver groove 111. Typically, the curvature of each convex section 115 is selected to have a narrower curvature, than a corresponding circle around 125.

The particular serpentine receiver groove 111 depicted is defined by outer wall 112 and inner wall 113. Outer wall 112, then, has inner convex sections 112*c* and concave sections 112d; and, inner wall 113 has outer convex sections 113c and concave sections 113d. For the particular example shown, each of walls 112, 113 is, independently, continuous, closed and solid.

In the particular example shown, the groove 111 has eight convex sections and eight concave sections. The groove 111, forms a octagonal or outwardly directed, petal shape, as previously discussed with respect to projection 70, FIG. 5A.

Groove 111 is shaped to receive projection 70 projecting therein when cartridge 25 is installed in air cleaner 1, FIG. 2.

Referring to FIGS. 6 and 7, example dimensions are indicated, for the assembly 1 depicted and described herein. Of course alternative dimensions are possible, and alternate applications that techniques described herein. Referring to FIG. 7, DI=26.3 mm; DJ=8°; DL=9°; DK=3.5 mm; and, DH=2.8 mm. Referring to FIG. 6, DA=10 mm; DB=45°; DC=22.5°; DD=95.6 mm diameter; DE=28.3 mm diameter; DG=5 mm; and, DF=14.5 mm radius.

The receiver groove of 111 will typically be at least 10 mm deep, usually at least 15 mm deep and often within the range of 20-40 mm deep, although alternatives are possible in some applications of the techniques described herein. In general, the depth of groove 111 is meant to be the dimension as indicated at DI, FIG. 7.

The groove 111, then, can be viewed as defined between walls 112, 113, which join one another along base 115, FIG. 7A. In a typical receiver arrangement 110, the groove 111 will be no more than 14 mm wide and typically 5-12 mm wide, inclusive, in a region extending from bottom or base 115 at least 60% of the distance toward an opposite open end 116, FIG. 7. Of course adjacent end 116, the groove 111 can flare outwardly substantially, to facilitate engagement with projection 70.

The width of the groove 111 and corresponding thickness of the projection 70 should be selected such that once the projection 70 extends into the groove 111, the cartridge 5 cannot be readily rotated relative to the access cover 4, due to interference between the serpentine projection and the serpentine groove. This is followed by the selected curvatures to concave and convex regions described.

Figure 8:
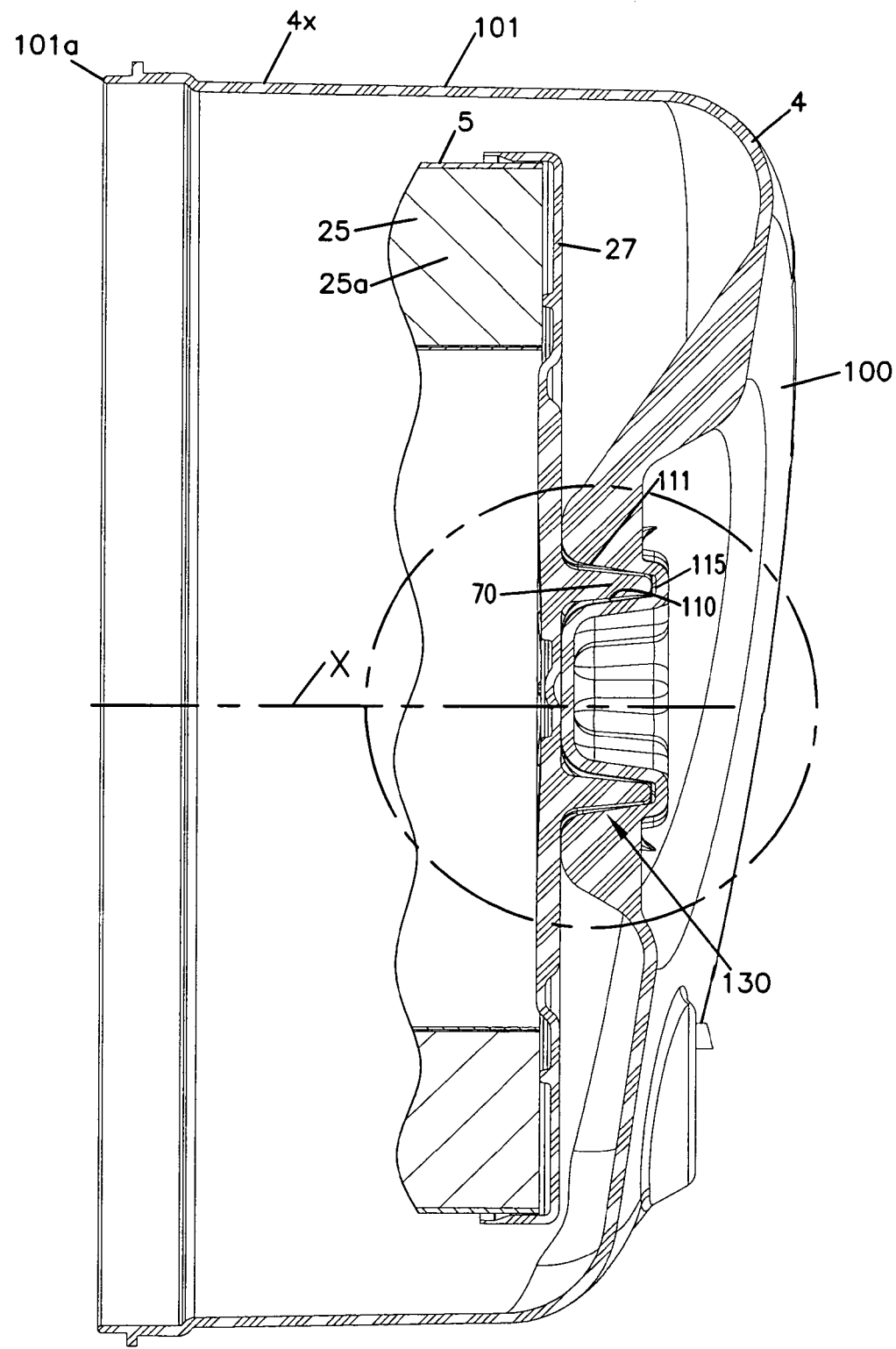
FIG. 8 is a schematic cross-sectional view depicting engagement between the cartridge of FIG. 5 and the access cover of FIG. 7.
Figure 8A:
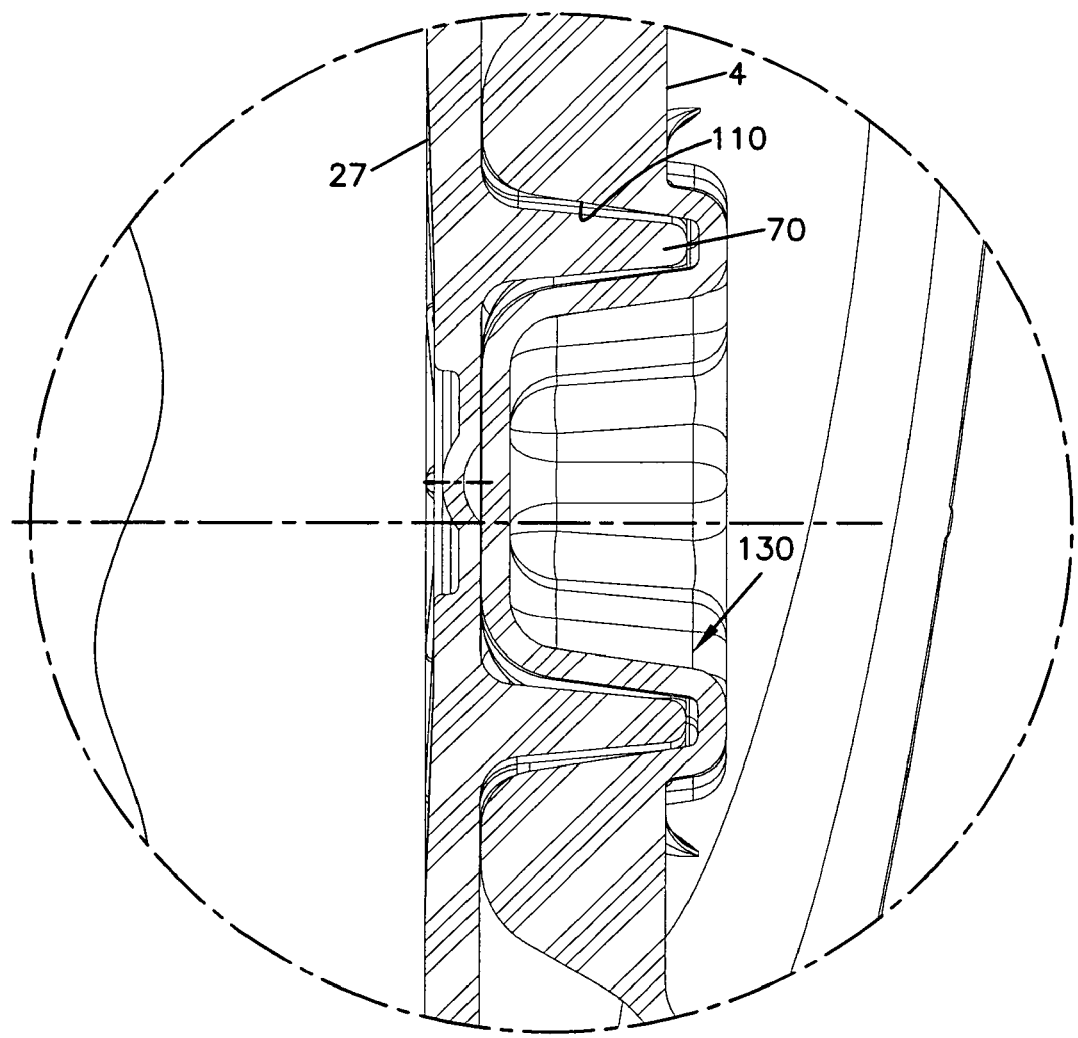
FIG. 8A is an enlarged fragmentary, view of a selected portion of FIG. 8.
Figure 8B:
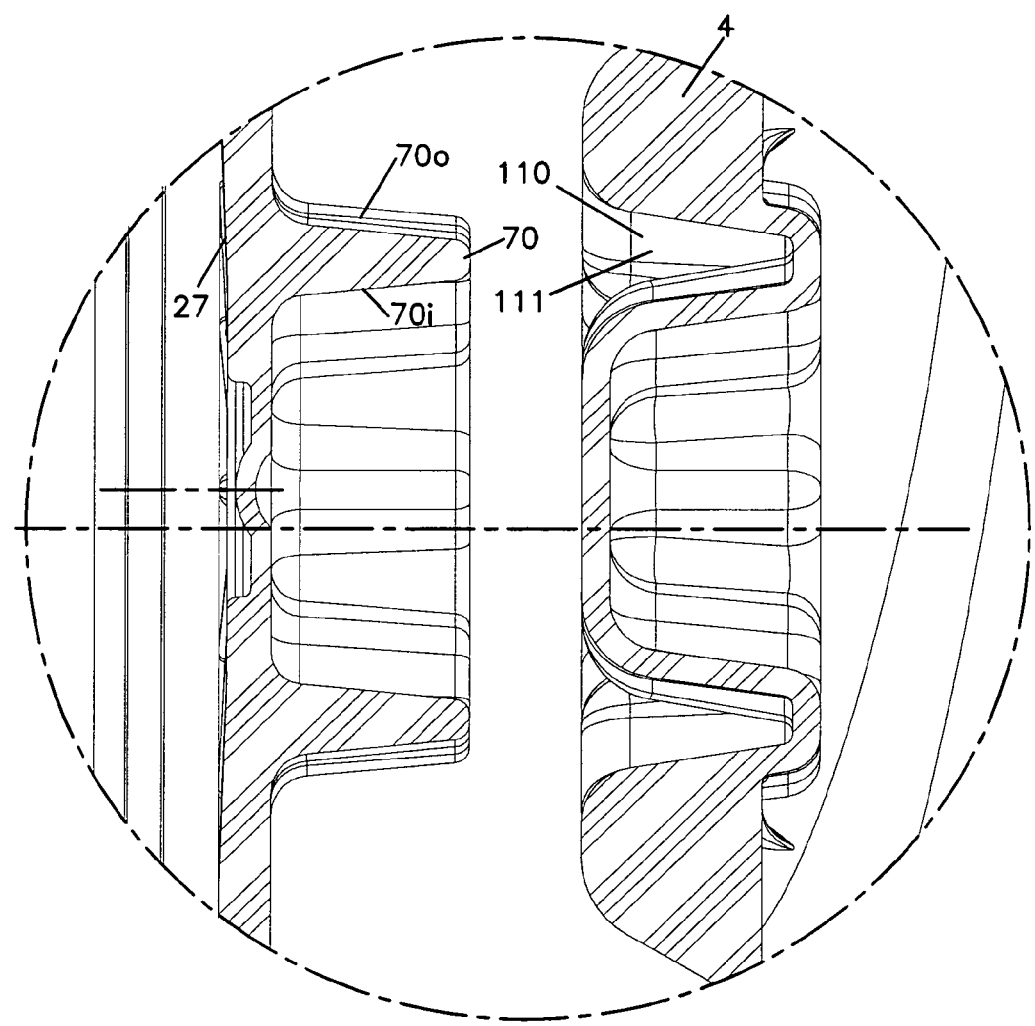
FIG. 8B is an exploded enlarged fragmentary, schematic view corresponding to FIG. 8A.

In FIG. 8, a schematic cross-sectional view is provided depicting end cap 27, FIG. 5, in engagement with access cover 4, FIG. 7. In particular, projection member 70, FIG. 5, is seen to be received within receiver groove 111, FIG. 7. In FIG. 8A, an enlarged fragmentary view of a portion of FIG. 8 is depicted. In FIG. B, an enlarged, exploded, view is provided.

Figure 9:
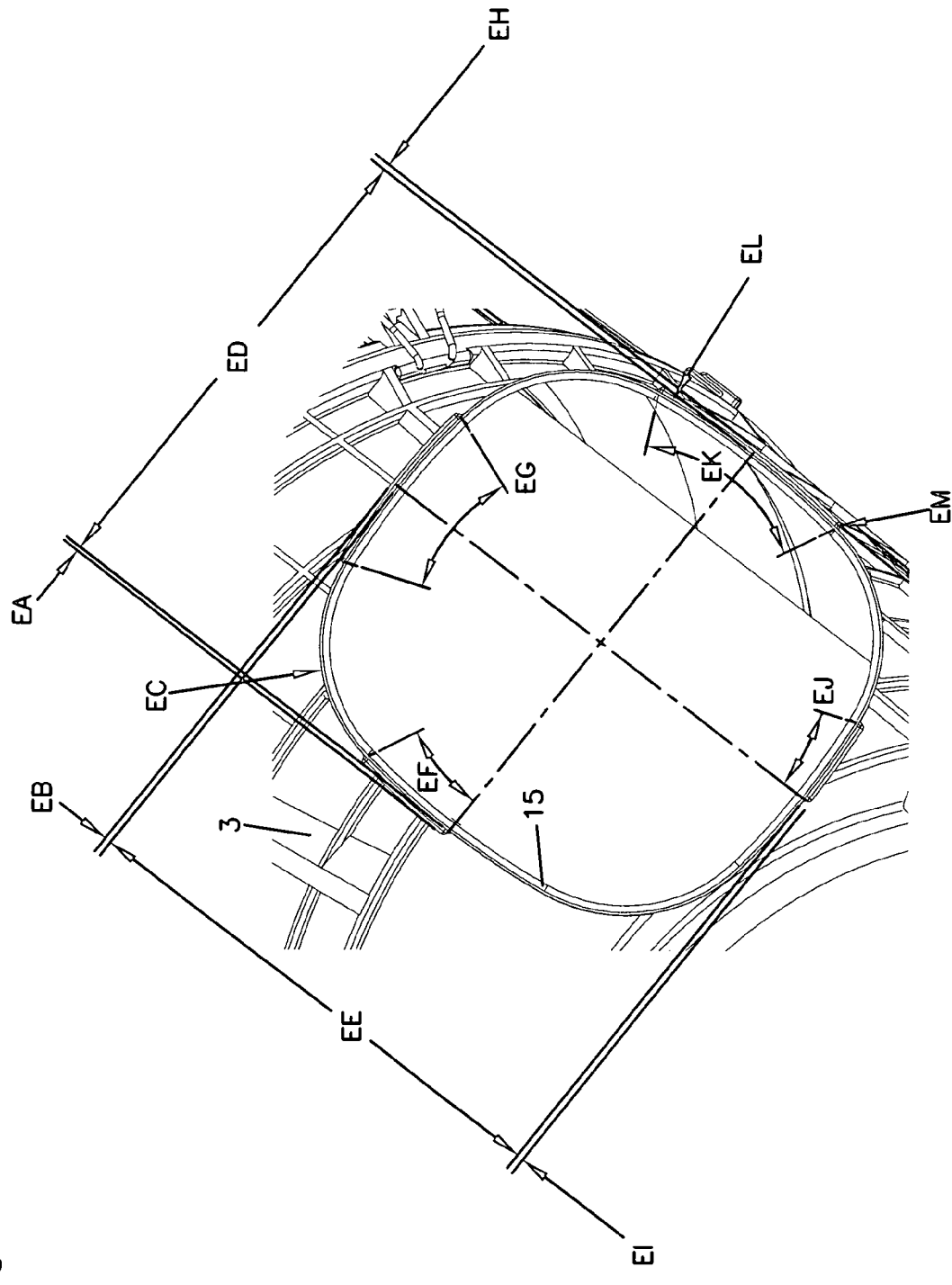
FIG. 9 is a fragmentary, schematic view of a portion of FIG. 1.

Attention is now directed to FIG. 9, an enlarged fragmentary view of the inlet 15, FIG. 1. In FIG. 9 example dimensions are indicated as follows: ED=180 mm; EH=2.5 mm; EA=2.5 mm; EE=190 mm; EB=2.5 mm; EI=2.5 mm; EF=25.4°; EJ=20.4°; EK=51°; EG=41°; EM=8 mm radius; EC=60 mm radius; and, EL=300 mm radius.

II. The Example Projection/Receiver Support Arrangement

Referring again to FIG. 8, the arrangement comprising projection 70 and receiver groove 111 is referred to herein, generally, as a projection/receiver arrangement 130, allowing for engagement between access cover 4 and cartridge 5, along closed end cap 27 of cartridge 5. The projection/receiver arrangement 130 provides, for example, for support against cantilevered motion of the cartridge 5 within the housing 2 of air cleaner 1, FIG. 2. That is, cartridge 5 cannot move substantially up or down or back or forth, at end 27, due to support of end piece 27 by receipt of projection 70 into groove 111 on the access cover 4.

Further, the particular projection/receiver arrangement 130 depicted, is a "anti-rotation" projection/receiver arrangement. By this, it is meant that cartridge 5 and access cover 4 cannot rotate relative to one another, once there has been an engagement of the projection/receiver arrangement 130 (by projection 70 extending into groove 111). This is because the shape of the serpentine receiver groove 111 and the serpentine shape of the projection 70. In particular, the example serpentine (petal) shape prevents access cover 4 and cartridge 5 from being able to rotate relative to one another, once engagement has occurred. This is facilitated by curvatures as described.

III. General Principles

In general, as the example of FIGS. 1-9 shows, a projection/receiver system is provided for interaction between a portion of an air cleaner housing, specifically an access cover and a filter cartridge. The example projection/receiver arrangement includes a projection on the cartridge receivable within a receiver (groove) on the access cover.

The projection on the filter cartridge is configured so that it is not required for a portion of an end cap on which the projection is positioned, to project substantially (greater than 10 mm) into an interior of the cartridge. Although such a projection may be feasible in some instances, it is not a specific requirement.

The projection/receiver arrangement operates to inhibit cantilevered motion of the closed end of the cartridge in any direction; and, prohibits rotation of the cartridge once positioned in the housing. This is because the receiver is a groove having a non-circular, serpentine, shape; and, the projection is configured so that when received in the groove, undesirable levels of rotational movement and cantilevered movement are inhibited.

Support to the filter cartridge of the closed end can be managed, without need for a shield/support ring extending around the outside of the cartridge, but spaced inwardly from the outside wall of the access cover. Air flow in this region is, thus, not interrupted or disrupted. Further for the particular example depicted, air flow can move into an end of the access cover, with convenient direction of dust/water through a dust ejector, without having a shield blocking direct air flow into portions of the cartridge.

The system presented is also advantageous so that it can be used to inhibit installation, in a selected air cleaner housing, of an unapproved or unauthorized cartridge. Thus, it can be used to facilitate quality control by the air cleaner manufacturer, engine manufacturer and/or equipment owner, with respect to service parts.

The system presented is also advantageous, in that it is relatively inexpensive to implement. The access cover can be molded to have the features needed, as well as the perform used as a closed end cap on the cartridge. Tolerances with respect to cartridge length, and media pack inner and outer diameter, do not affect the operation of the projection/receiver arrangement, to any appreciable, negative, extent.

IV. Additional Features

Attention is now directed to FIG. 7A. Receiver 110 includes a fin arrangement 140 surrounding an outer portion thereof. Fin arrangement 140, for the example shown, comprises three, evenly radially spaced fins 141, only two of the fins being viewable in FIG. 7. Fins 141 generally extend from an outer region 145 adjacent wall 4x inwardly to receiver arrangement 110.

The fin arrangement 140 inhibits support to an unauthorized cartridge by extension around projection 110. Thus, in general, a replacement cartridge would not likely be supported by access cover 4 against cantilevered motion, unless that cartridge 5 was also being supported against rotational motion.

It is noted that during installation, once the access cover 4 is advanced against the cartridge 5 sufficient for engagement of the projection/receiver arrangement, it may be necessary to twist the access cover slightly, until latches 21 are rotationally aligned with portions of the body 3 to which they will engage. Such a rotational motion is permitted, by the assembly. However once latches 20 are engaged, the access cover 4, engaged with a cartridge 5, will inhibit any undesirable level of further rotational motion.

V. Alternate Embodiments, FIGS. 10-19

Figure 18:
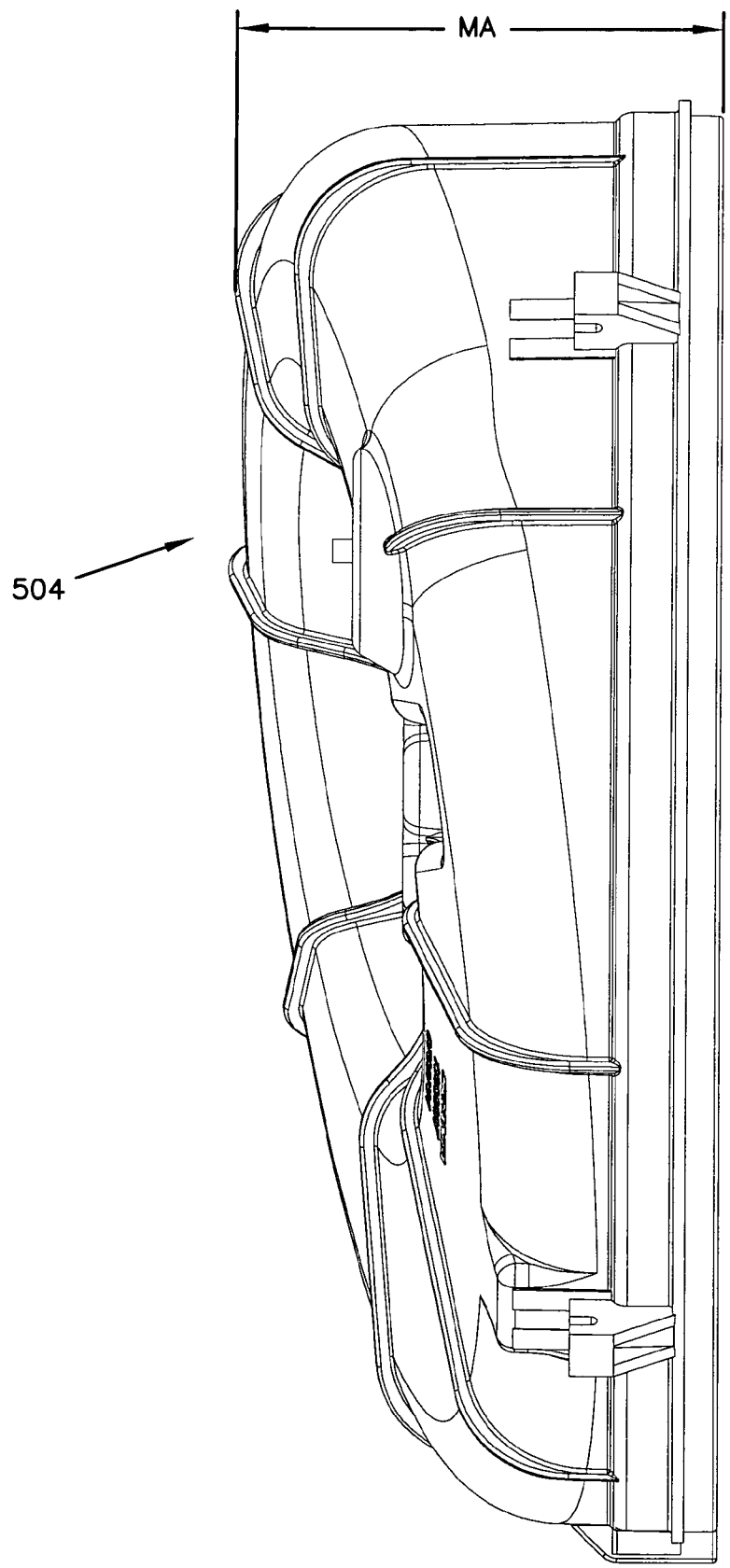
FIG. 18 is a schematic side elevational view of an alternate access cover component.
Figure 19:
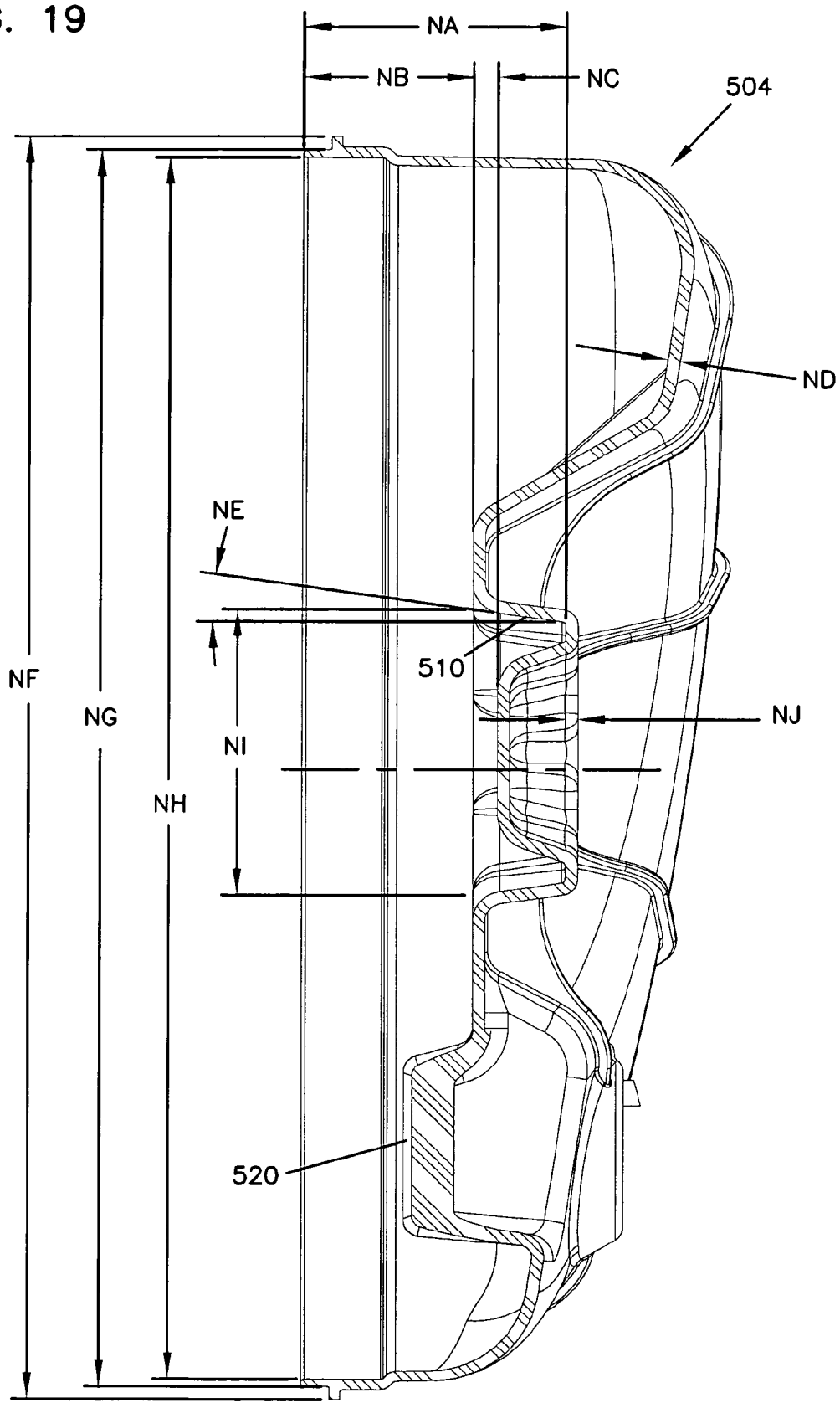
FIG. 19 is a schematic cross-sectional view of the alternate access cover component of FIG. 18.

In FIGS. 10-17, a first alternate embodiment is depicted. In FIGS. 18 and 19, an alternate embodiment of an access cover as depicted.

Figure 10:
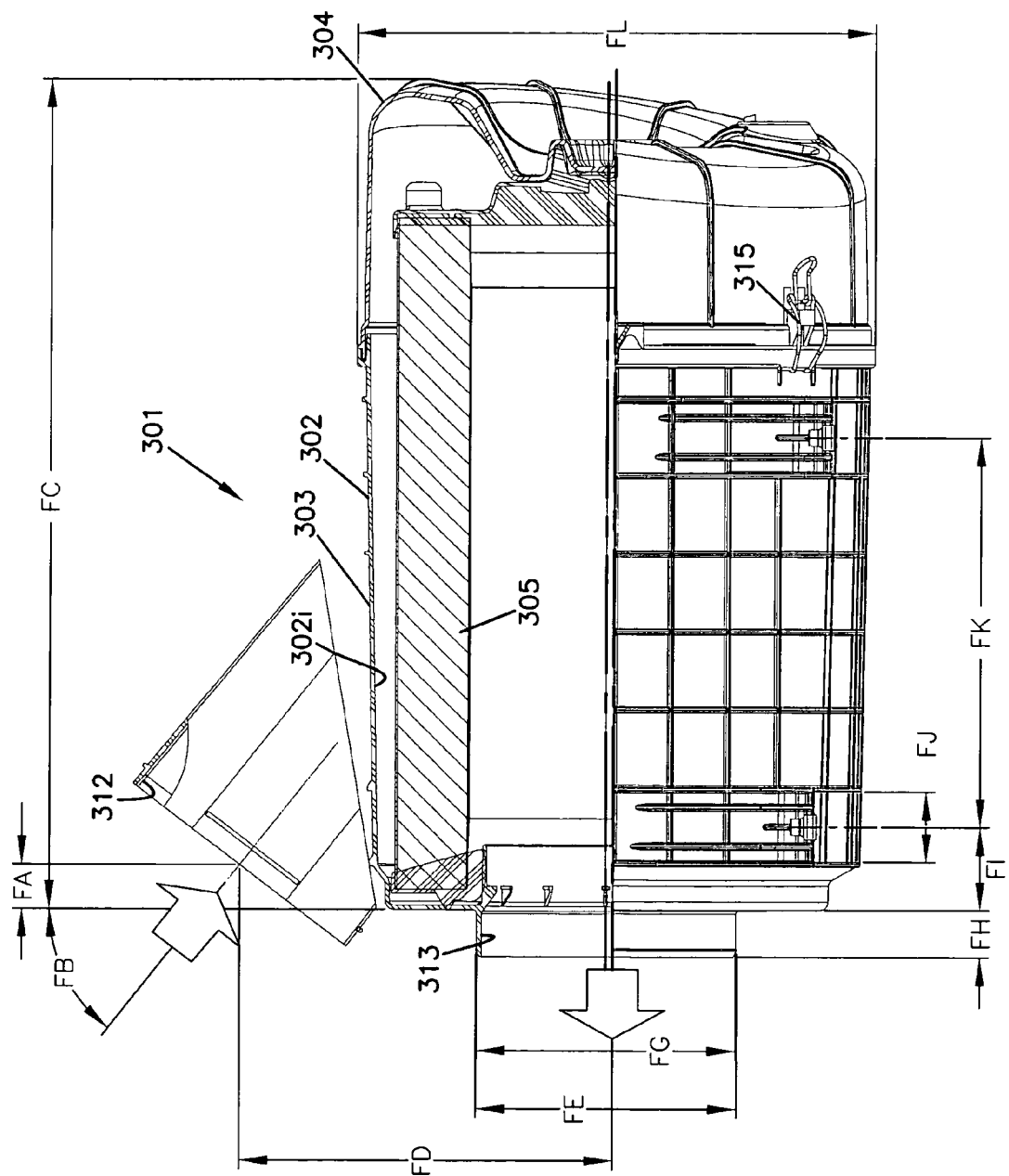
FIG. 10 is a schematic side elevational view of the second embodiment of an air cleaner according to the present disclosure.

Referring first to FIG. 10, an alternate air cleaner assembly 301 is depicted. Many of the features of the air cleaner 301 are analogous to those previously described. The air cleaner assembly 301 includes a housing 302 having a housing body 303 and access cover 304. Filter cartridge 305 is mounted with an interior 302i of housing 302. The housing 302 includes an inlet arrangement 312 and an air flow outlet arrangement 313. Access cover 304 is removably secured to the housing to the body 303, for service access to removable and replaceable filter cartridge 305. For the example shown, access cover 304 is secured in place by a latch 315.

In FIG. 10, example dimensions are provided as follows: FA=31.9 mm; FB=52°; FC=596 mm; FD=263.6 mm; FE=183 mm; FG=182 mm; FH=34 mm; FI=60 mm; FJ=50.5 mm; FK=280 mm; and FL=366 mm.

Figure 11:
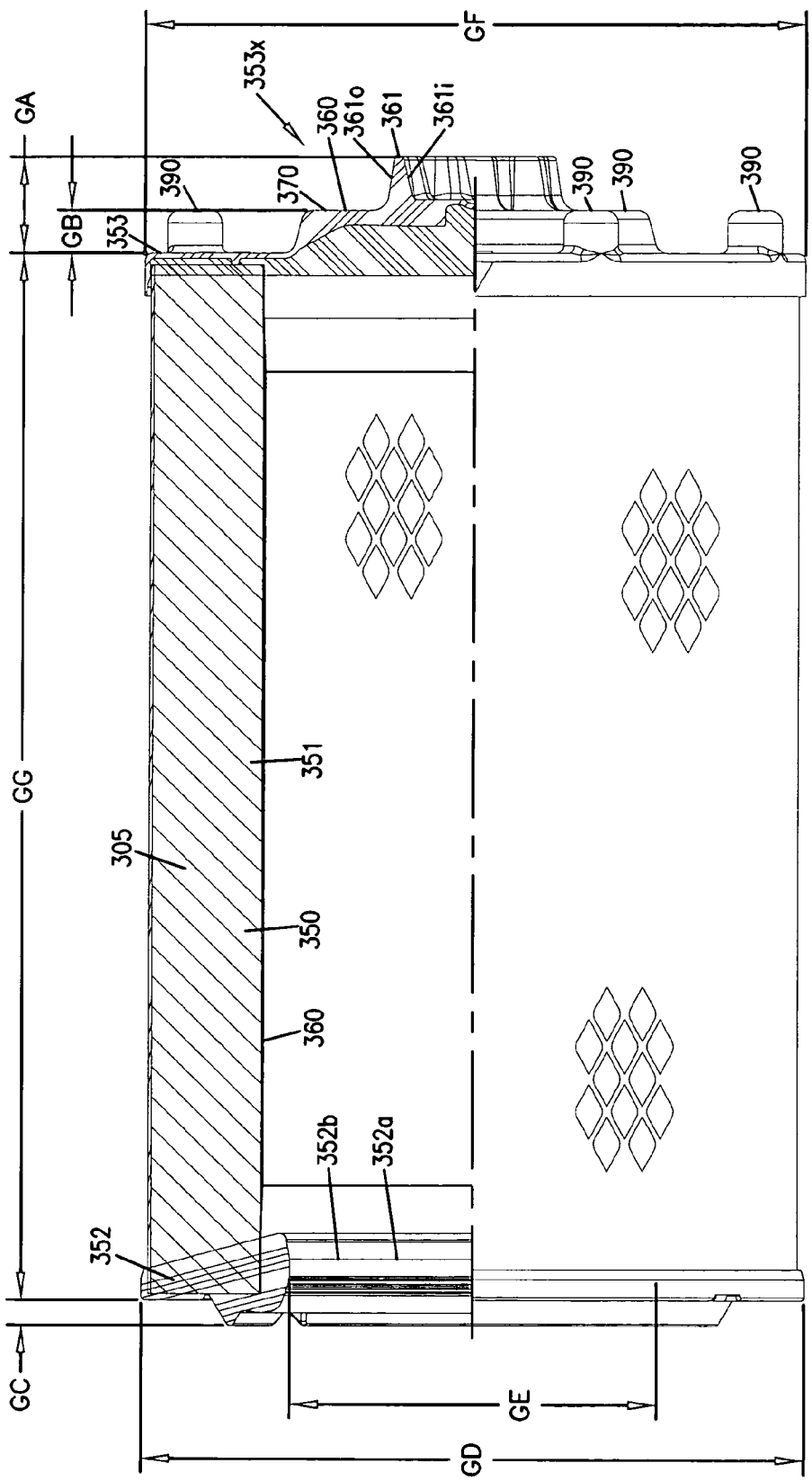
FIG. 11 is schematic enlarged cross-sectional view of filter cartridge element of the air cleaner in FIG. 10.

In FIG. 11, cartridge 305 is depicted. The cartridge 305 includes media pack 350 comprising media 351 extending between first and second end caps 352 and 353. The first end cap 352 can be generally analogous to end cap 26, FIG. 2. The media pack 350 surrounds and defines an open interior 360. End cap 352 includes a central aperture 352a surrounded by seal arrangement 352b.

End cap 353 has some analogous features to the previously described end cap 27 including outer surface 353x having a central portion 360 including a projection 361 having a serpentine inner and outer surfaces 361i and 361o respectively. With the particular cartridge 305 depicted, projection 361 is positioned on a central, outwardly projecting, platform 370. The projection platform 370 typically extends beyond the media pack 350 a distance of at least 10 mm, often at least 15 mm, for example 20 mm.a111

It is also noted that end cap 353 includes a plurality of spaced projections 390 thereon, each extend axially away from the media pack 350, in overlap with the media pack 350.

In FIG. 11, example dimensions are provided as follows: GA=45 mm; GB=20 mm GC=12 mm; GD=303.7 mm; GE=168.6 mm; GF=303.5 mm, and; GG=491.2 mm.

Figure 12:
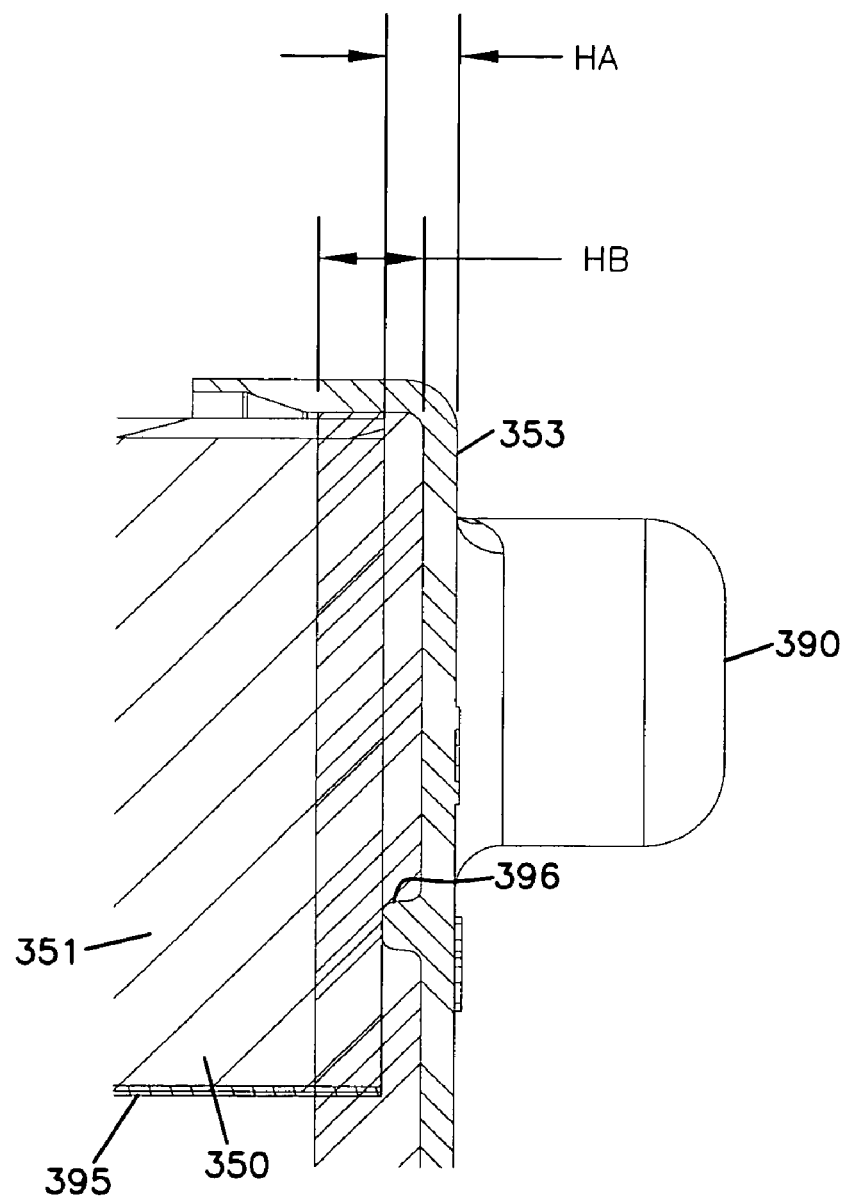
FIG. 12 is schematic, enlarged fragmentary view of a selected portion of FIG. 11.

In FIG. 12, an enlarged fragmentary schematic view of a portion of FIG. 11 is viewable. Here one of the projections 390 is viewable. Also, a portion of inner liner 395, around which the media 351 extends, is viewable. Further, media standoff ring 396 is viewable.

In FIG. 12, example dimensions are provided as follows: HA=5.5 mm; HB=8 mm.

Figure 13:
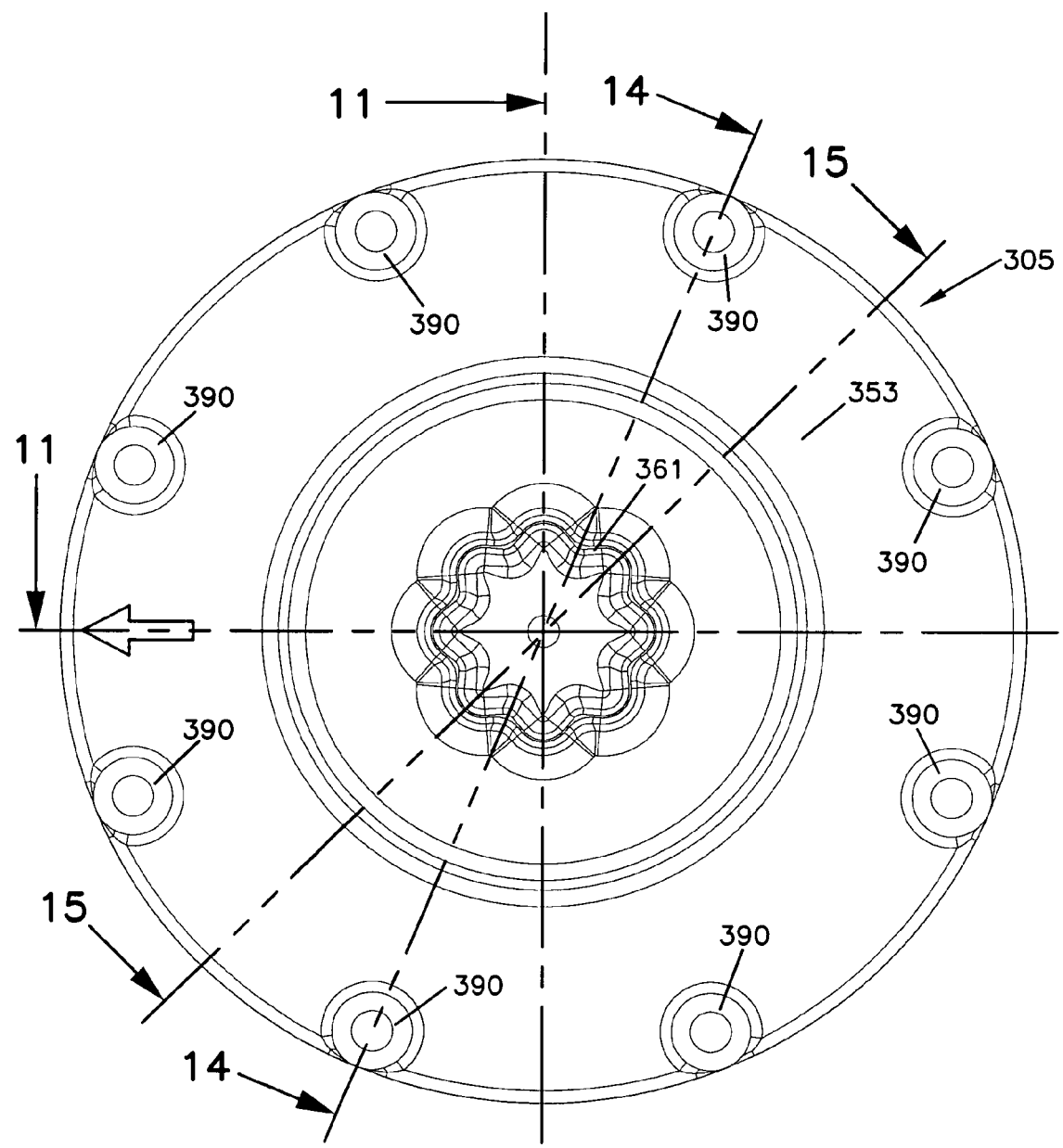
FIG. 13 is a schematic end view of the filter cartridge of FIG. 11.

In FIG. 13 an end elevational view of cartridge 305 is depicted, taken toward end cap 353. Here the spaced projections 390 are viewable, as well as the central, serpentine, projection 361.

In FIG. 13 the cross-sectional line defining in FIG. 11 can be seen.

Figure 14:
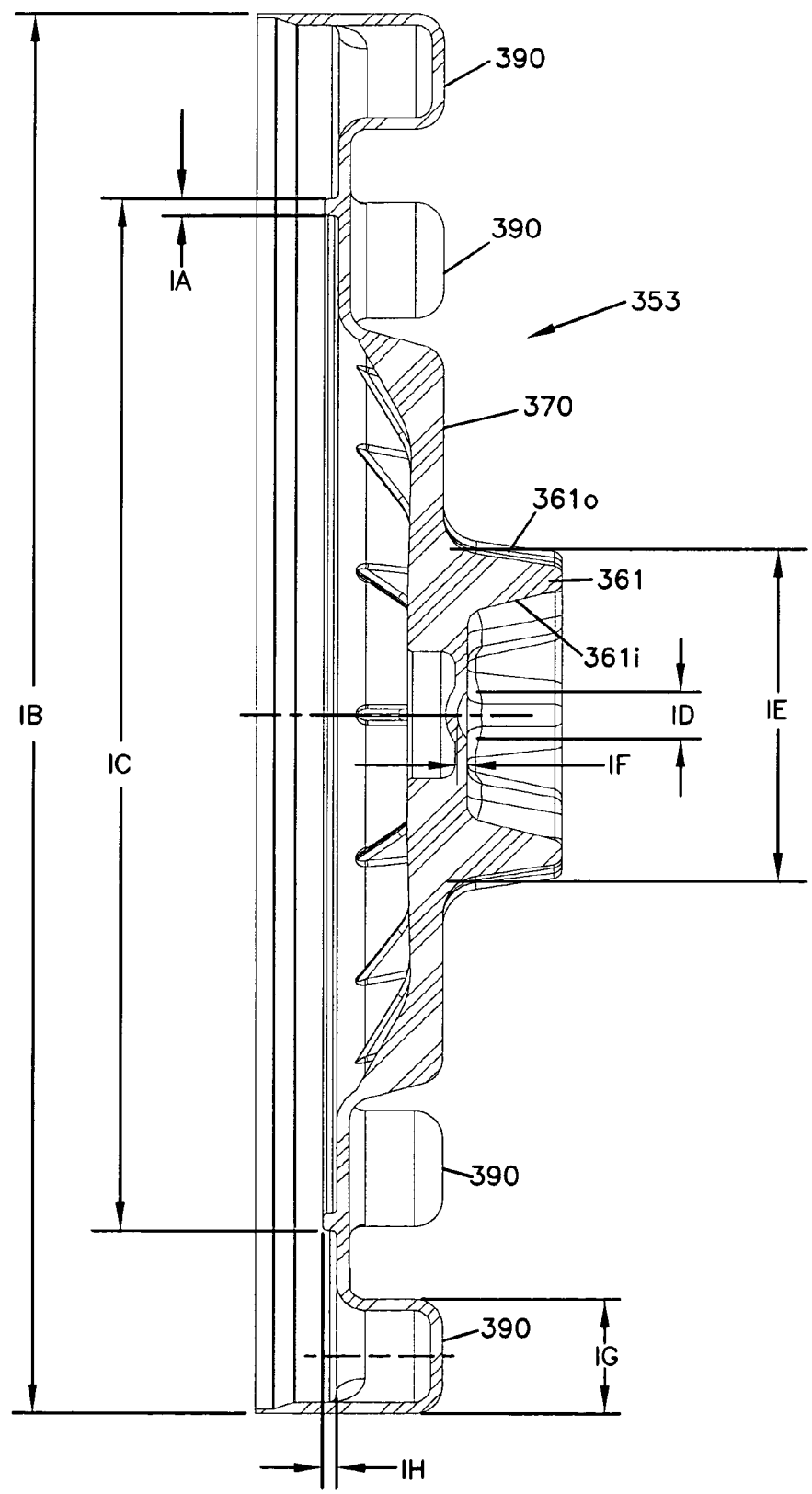
FIG. 14 is a schematic cross-sectional view of an end cap component of the filter cartridge of FIG. 11, taken along line 14-14, FIG. 13.

In FIG. 14 is a cross-sectional view of end cap 353. The cross-sectional view is taken along line 14-14, FIG. 13, although in FIG. 14 only the end cap 353 is depicted not the remainder of the media pack. In FIG. 14, example dimensions are provided as follows: IA=3.8 mm; IB=303.5 mm; IC=223.8 mm; ID=10 mm; IE=72.2 mm; IF=2 mm; IG=25 mm; and IH=3 mm. Again, projection 361 is viewable, having serpentine inner surface 361i and serpentine outer surface 361o, generally as previously described.

Figure 15:
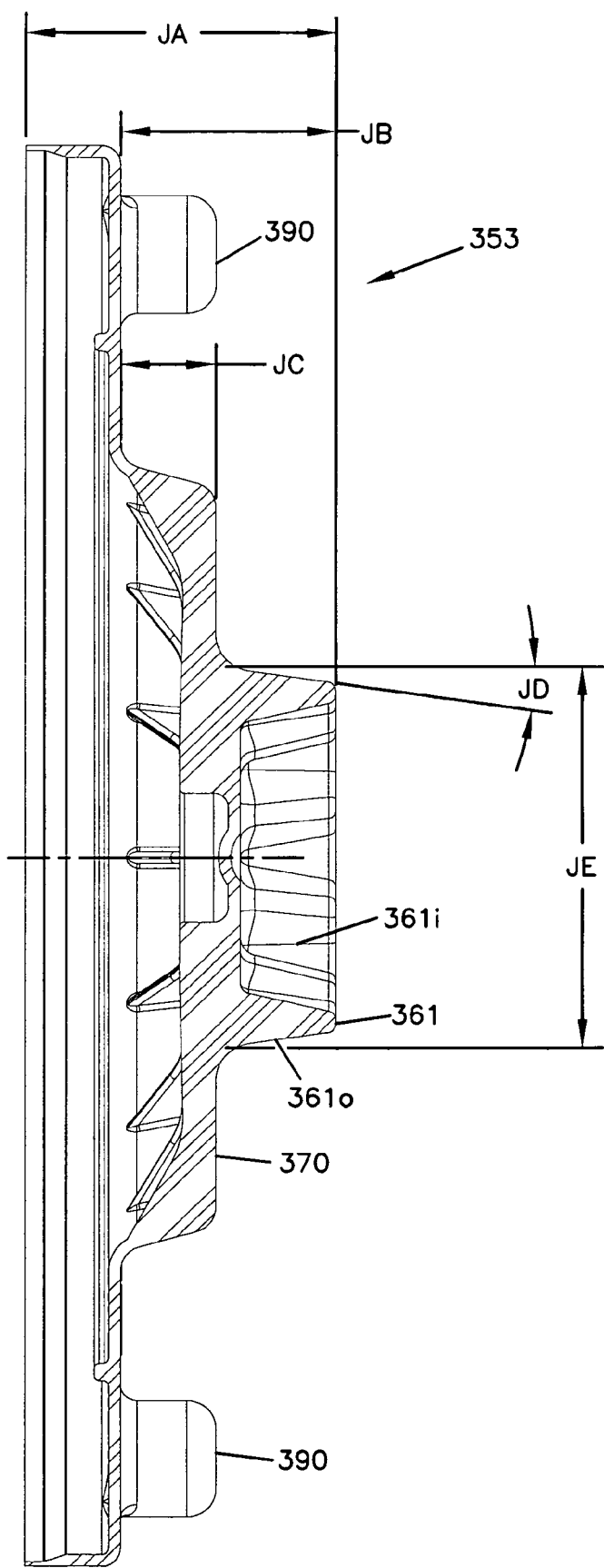
FIG. 15 is a second schematic cross-sectional view of the end cap component with the cartridge of FIG. 11; the cross-sectional view of FIG. 15 being taken along line 15-15, FIG. 13.

In FIG. 15, an alternate cross-sectional taken generally along line 15-15, FIG. 14, but only depicting end cap 353 as provided. Here, example dimensions are provided as follows: JA=65 mm; JB=45 mm; JC=20 mm; JD=8°; JE=81.5 mm.

Figure 16:
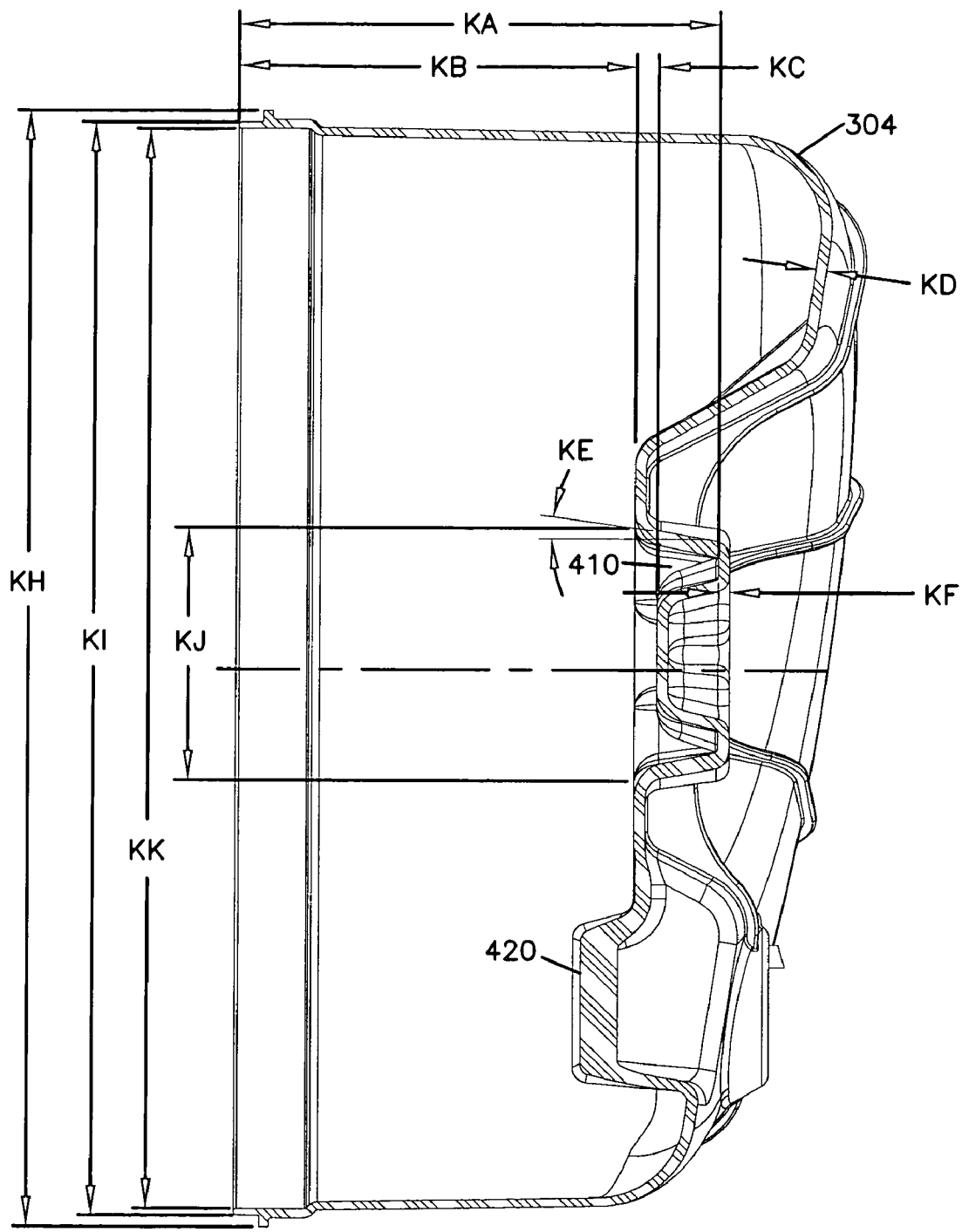
FIG. 16 is an enlarged, schematic, cross-sectional view of an access cover component of the air cleaner assembly in FIG. 10.

In FIG. 16, a cross-section of view of access cover 304 is viewable. It can be seen that the access cover 304 includes serpentine receiving groove 410, configured to receive projection 361 and support cartridge 305 in both non-rotational and anti-cantilevered port manner. Referring to FIG. 16, attention is directed to inner projection 420 in access cover 304. The projection 420 on the access cover 304 helps to ensure that a proper cartridge is positioned within assembly 305.

In FIG. 16, some example dimensions are provided as follows: KA=154.7 mm; KB=128.4 mm; KC=7 mm; KD=3.5 mm; KE=8°; KF=3.5 mm; KH=366 mm; KI=358.4 mm; KK=354 mm; and, KJ=82.8 mm.

Figure 17:
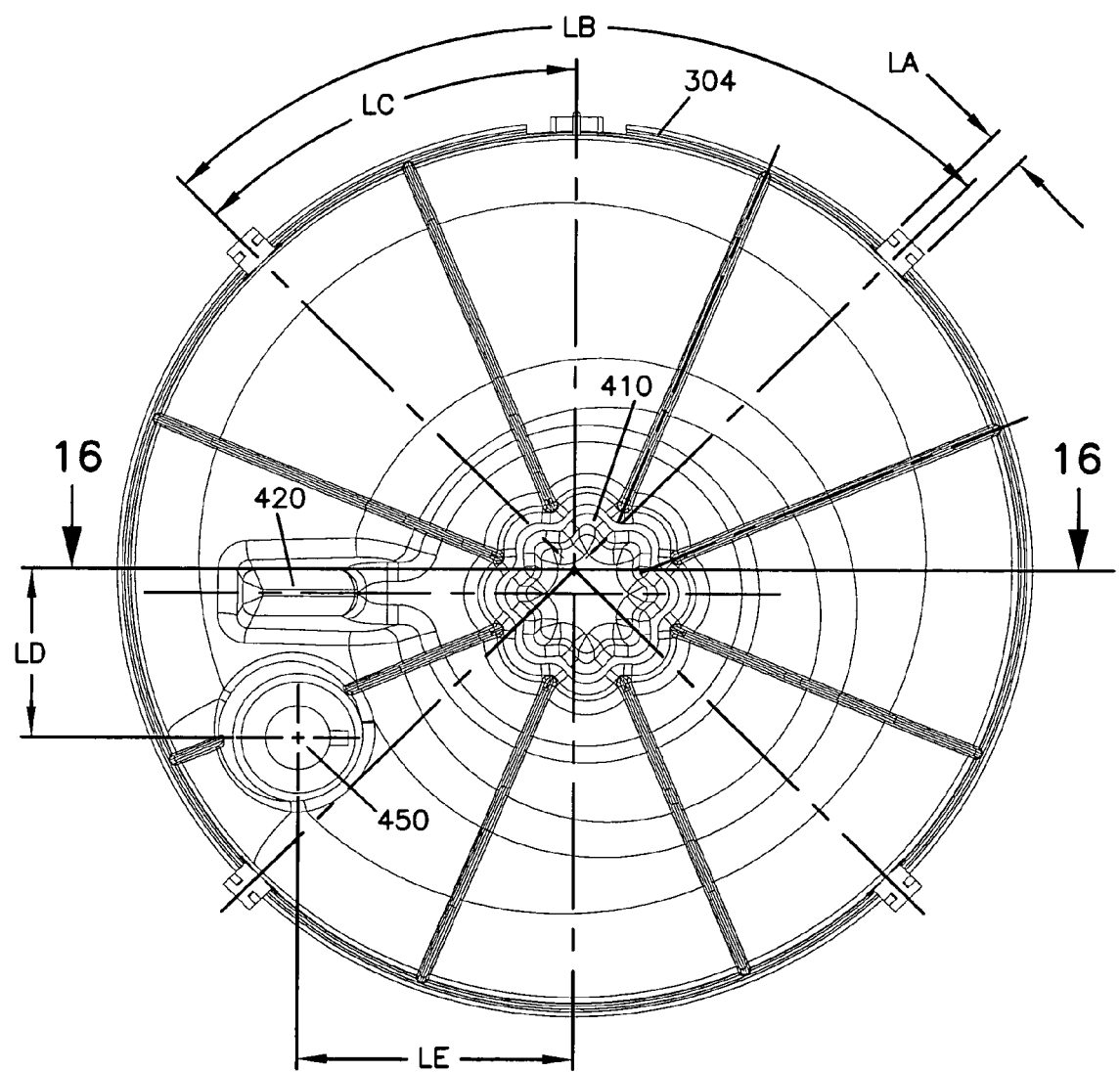
FIG. 17 is a schematic view of an internal surface of the access cover component of FIG. 16.

In FIG. 17, an end elevational view taken directed toward an interior surface of access cover 304 is depicted. Here, receiver 410 is viewable, as well as projection 420, and injection port 450. In FIG. 17, example dimensions are provided as follows: LA=15 mm; LB=90°; LC=45°; LD=69 mm; LE=110 mm.

The example of FIGS. 10-17, indicates the utilization of a projection 420 on an interior surface of an access cover 304, directed toward a cartridge 305. Further, the cartridge 305 is provided with projections 390 thereon, spaced radially around and outer edge of the cartridge 305, on a closed end cap 367, in a preferred manner.

In FIGS. 18 and 19, an alternate access cover 504 is depicted. The alternate access cover indicates that alternate sides to access covers can be used for assemblies according to the present disclosure. For example, access cover 504 can be used in place with access cover 304. The features depicted provide for analogous operation. Referring to FIG. 18, for the example shown mention MA=121 mm.

Referring to FIG. 19, access cover 504 includes serpentine receiving groove 510 and projection 520 having analogous operation to analogous features in previously described embodiments.

Referring to FIG. 19, example dimensions are as follows: NA=74.7 mm; NB=48.4 mm; NC=7 mm; ND=3.5 mm; NE=8°; NF=366 mm; NG=358.4 mm; NH=354 mm; NI=82.8 mm; and, NJ=3.5 mm.

VI. Further Example Features, FIGS. 20-28

Figure 20:
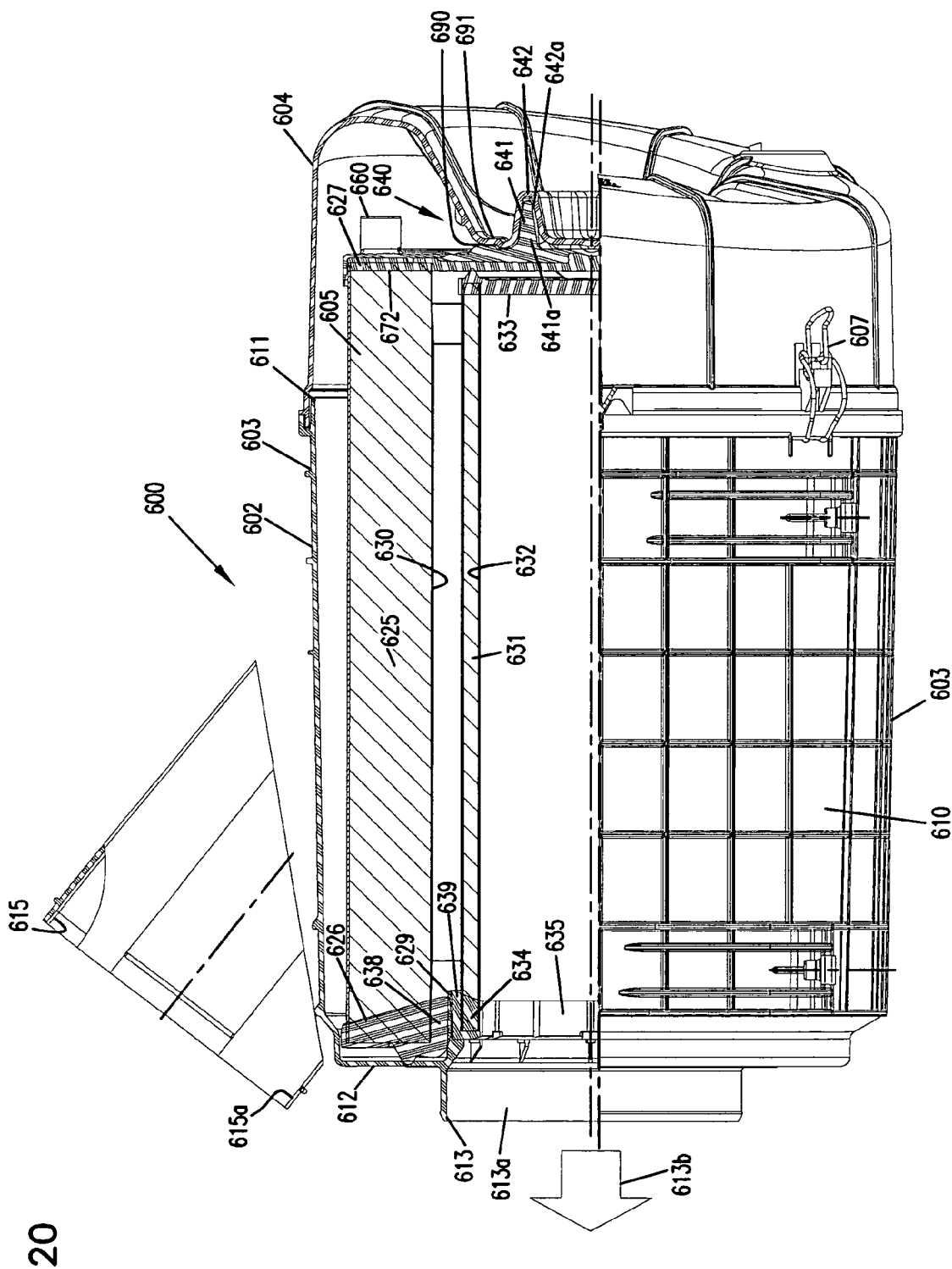
FIG. 20 is a schematic side elevational view of a modified embodiment of an air cleaner according to the present disclosure.

Additional features in arrangements having general features in accord with those previously described, are depicted in connection with FIGS. 20-28. Referring first to FIG. 20, an air cleaner assembly 600 is depicted, schematically, in side elevational view with portions broken away to show internal detail. The air cleaner assembly 600 includes a housing 602 comprising a housing body 603 and removable access or service cover 604. In the example shown, the access or service cover 604 is secured in place by latches 607.

The assembly 600 includes removable and replaceable, i.e. serviceable, filter cartridge 605.

In general, the housing body 603, comprises a sidewall 610 having a first open end 611 and a second opposite end 612 with a air flow passageway 613 thereat. In the example shown, a housing 602 further includes a second air flow passageway 615, in this instance in the housing body 603.

Analogously previous examples, for the particular example shown, air flow passageway 613 is an air flow outlet passageway defined by outlet tube 613a, as shown by arrow 613b. The airflow passageway 615 is an inlet air flow passageway defined by inlet tube 616a.

Access cover 604 is removable from housing body 603, to leave housing body 611 open for insertion or removal of cartridge 605.

Cartridge 605 comprises a media pack 625 extending between first and second opposite end caps 626, 627. In a typical arrangement, end cap 627 will be a closed end cap, i.e. it has no aperture therethrough, through which air can flow. End cap 26, however, will typically be an open end cap, including central flow aperture 629 therethrough around which the media pack 625 extends.

The media 625 surrounds an open interior 630. The aperture 629 is in air flow relationship with the open interior 630.

In addition to primary filter cartridge 605, a secondary safety filter cartridge 631 is provided in open interior 30. Safety cartridge 631 comprises media 632 extending between closed end cap 633 and open end cap 634. Open end cap 634 defines central aperture 635 in air flow relationship with aperture 613a.

The main cartridge 605 includes a housing seal arrangement 638 on end cap 626, removably sealed to a portion of the housing 602, when the cartridge 605 is installed. Similarly, safety filter 631 includes seal arrangement 639, removably sealed to a portion of housing 602, when safety cartridge 631 is installed.

Media in the cartridges 605, 631, can be provided with inner and/or outer liners, for media support, as desired.

Still referring to FIG. 20, it is noted that the air cleaner assembly 600 includes a projection/receiver arrangement 640, comprising in the example shown, a first member 641 of the projection/receiver 640, on the cartridge 605; and, second member 642 of the projection/receiver arrangement 640, on the access cover 604. Although alternatives are possible, the particular example depicted, member 641 is a projection member 641a; and, member 642 is a receiver member, 642a. This is analogous to previous embodiments described.

The projection/receiver arrangement 640 can generally comprise a serpentine projection 641a and serpentine receiver 642a, analogously to previously described embodiments, although alternatives are possible.

Analogously to the access cover depicted in FIG. 17, access cover 604 includes a projection thereon. This projection is indicated generally at 650, FIG. 25. The projection 650 is spaced radially outwardly from receiver 642a. In the example shown, the projection 650 does not extend radially completely around central axis 604x, FIG. 25. This is analogous to projection 420, FIG. 17, although the shape is different. Projection 650 inhibits an undesirably long cartridge from fitting within assembly 1, as this will result in interference with projection 650.

Figure 26:
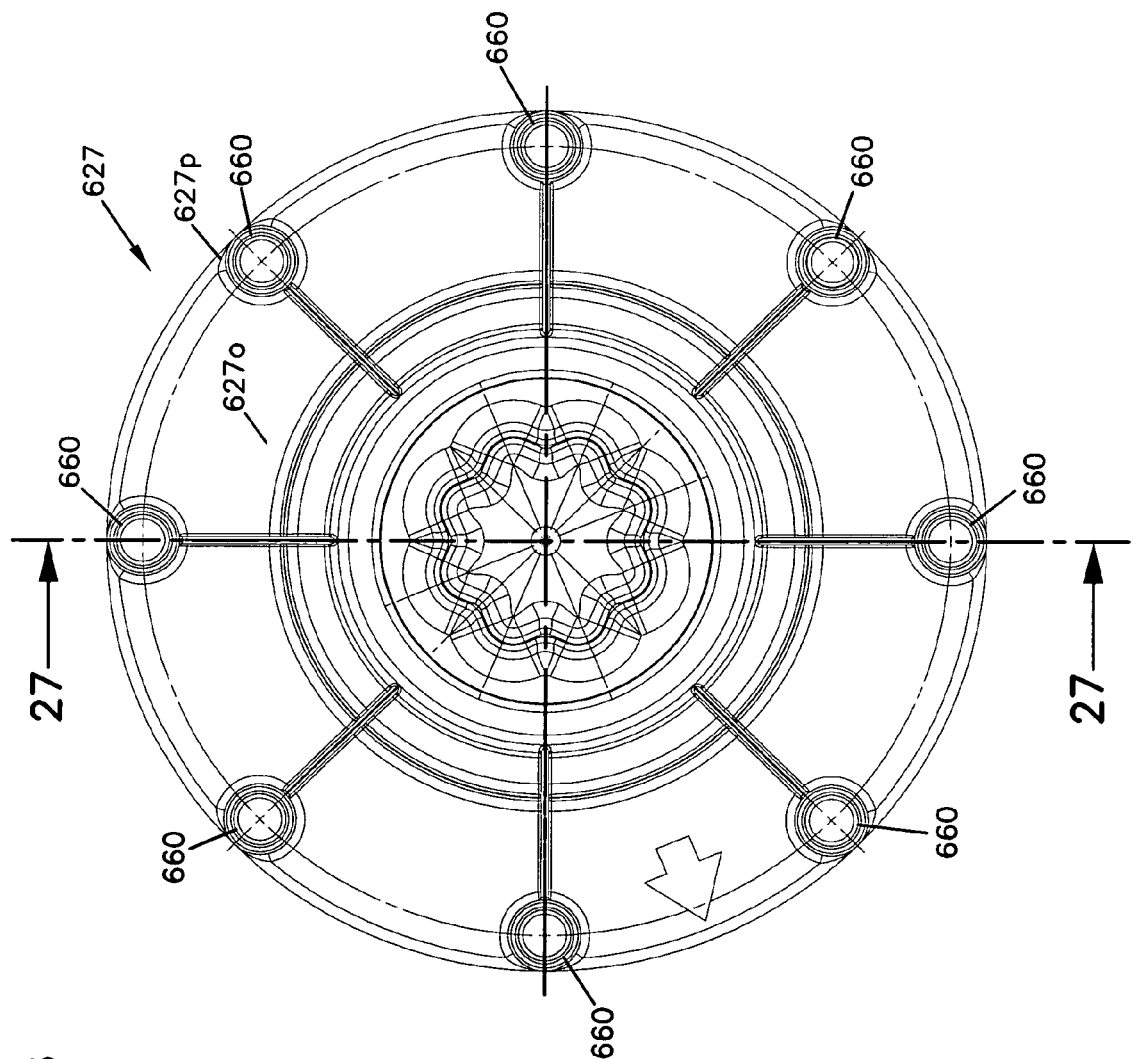
FIG. 26 is a schematic enlarged end elevational view of a closed end cap component of a filter cartridge in the assembly of FIG. 20.

Cartridge 605 provided with a closed end cap 627 having a plurality of projections 660 thereon. The projections 660 are depicted in FIG. 26, a view of end cap 627 directed toward an outer surface 620 thereof. In the particular example shown, eight projections 660, radially, evenly, spaced, each generally adjacent an outer perimeter, 627p, are shown on end cap 627. The projections 660 can be viewed in the cross-sectional view of end cap 627, FIG. 27. Each projection 660 is typically at least 10 mm long, usually at least 15 mm, and often at least 20 mm long, dimension L of FIG. 27. The projections 660 provide that the cartridge 605 can be mounted in an alternate air cleaner assembly which provides a support ring engaging the projections 660, with the projections 660 extending around the support ring to provide cantilevered support. That is, the projections 660 are adapters, which allow the cartridge 605 to be installed in certain alternate air cleaners, for example with an alternate type of cantilevered support at the closed end 627 of the cartridge 605.

Figure 28:
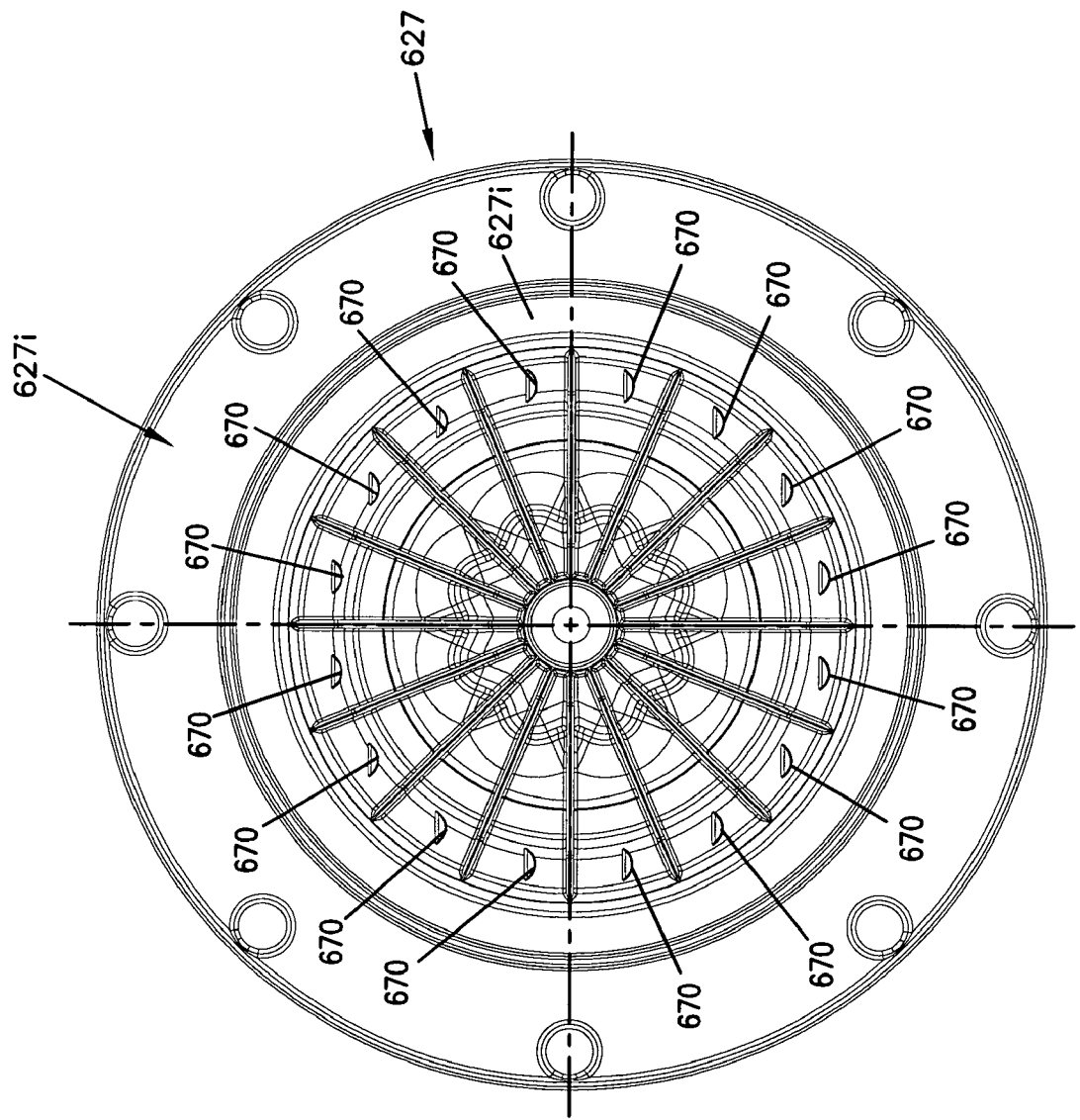
FIG. 28 is a view of an interior side of the end cap of FIGS. 26 and 27.

Attention is now directed to FIG. 28. In FIG. 28, end cap 627 is depicted, toward a surface 627i, which forms an interior surface, when installed in cartridge 605, FIG. 20.

Hooks 670 are depicted on surface 627. The hooks 670 provide for mechanical interlock to a hard polyurethane potting, when end cap 627 is potted to the media 625, FIG. 20. The potting is shown generally at 672, FIG. 20.

Figure 21:
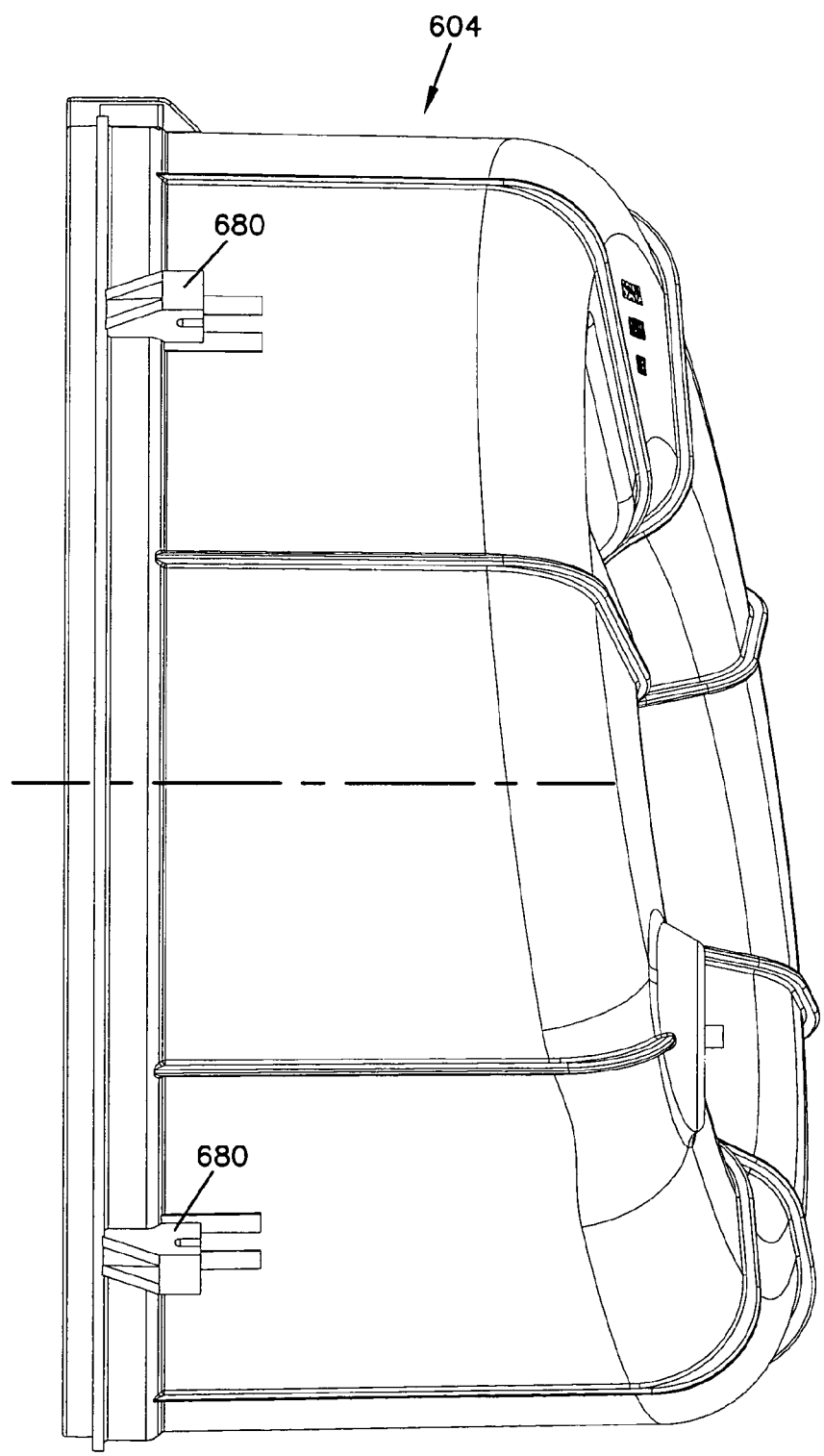
FIG. 21 is a schematic side elevational view of an access cover component, of the assembly of FIG. 20.

Referring to FIG. 21, a side elevational view of access cover 604 is shown, rotated 180° from the orientation of FIG. 20. It is noted that projections 680 are viewable as mounts, for latches 607, but in FIG. 21, access cover 604 is shown without latches thereon.

Figure 22:
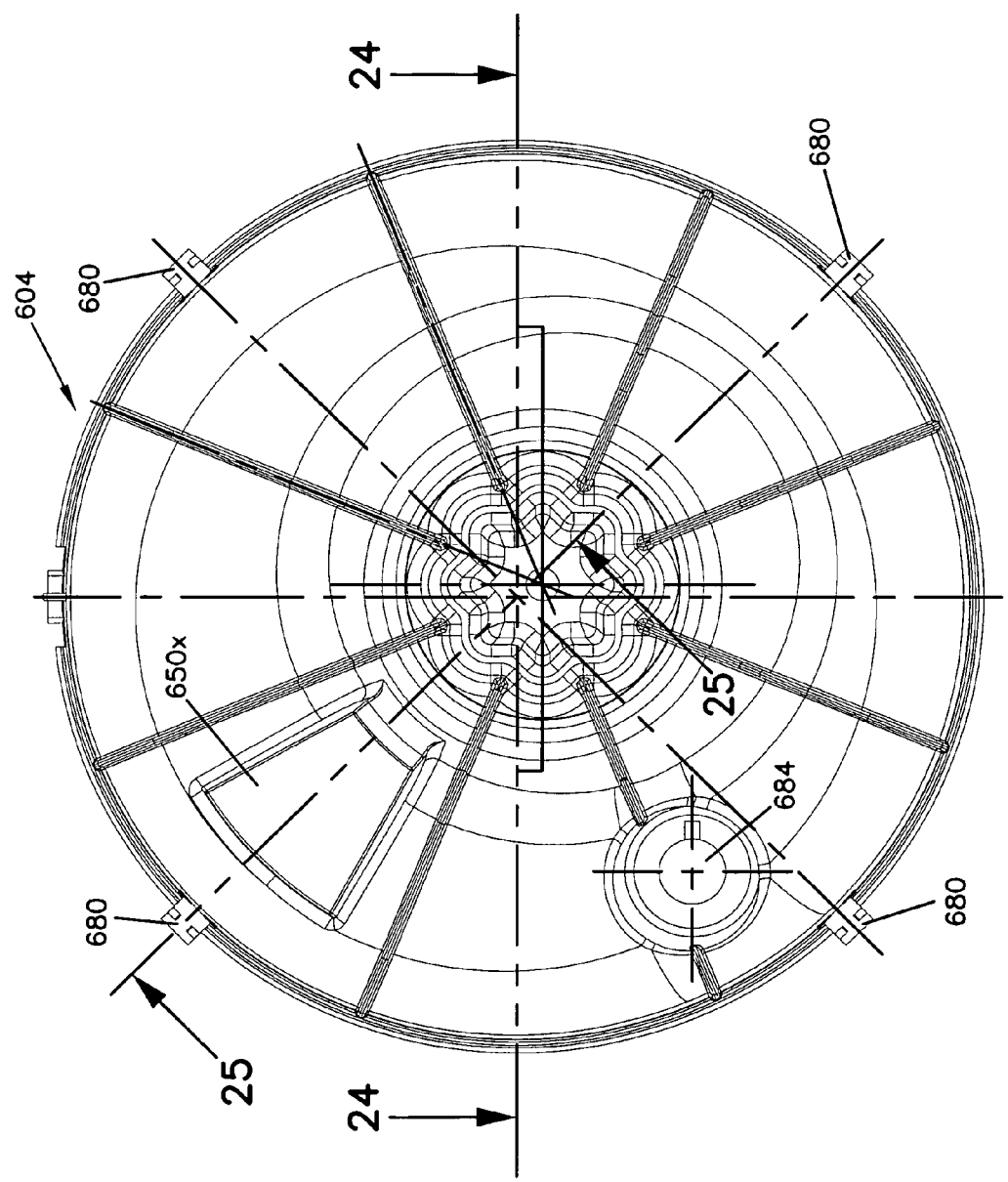
FIG. 22 is a schematic external end view of the access cover component of FIG. 21.

In FIG. 22, an end elevational view of access cover 604 is shown, the view of FIG. 22 being generally toward an exterior surface. At 684 an ejector port is shown. At 650x, an external view of projection 650 is shown.

Figure 23:
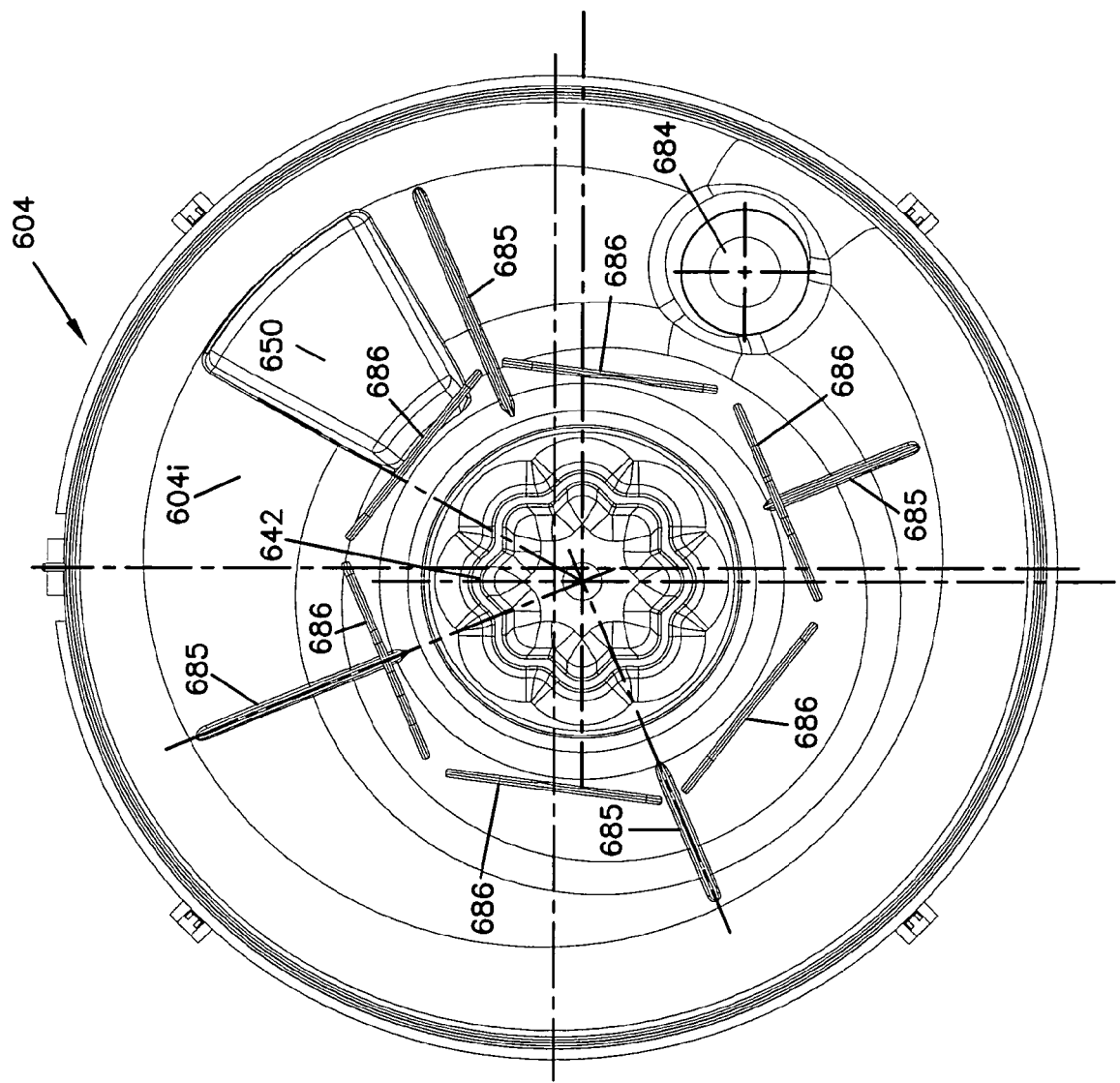
FIG. 23 is a schematic internal view of the access cover component of FIG. 21.

FIG. 23 is generally taken toward an interior surface of access cover 604. Here, a first set of fins or ribs 685 is depicted. The first set of fins or ribs 685 generally comprises fins or ribs aligned radially, on an interior surface 604i of access cover 604. The ribs 685, then, are aligned with radii. The fins or ribs 685 extend along an inclined surface region of surface 604i, extending generally outwardly. The ribs 685 inhibit an inappropriate cartridge positioning seeking support to form an adjacent region surface 604i.

Still referring to FIG. 23, a second set of fins or ribs 686 is provided. The fins or ribs 686 are generally tangential, i.e. perpendicular to radii, in the example shown there are six fins or ribs 686 generally defining an hexagonal pattern around, and spaced from, receiver 642a. These fins or ribs 686 also inhibit the use of an inappropriate surface portion within interior 604i, as a support surface for a cartridge.

Figure 24:
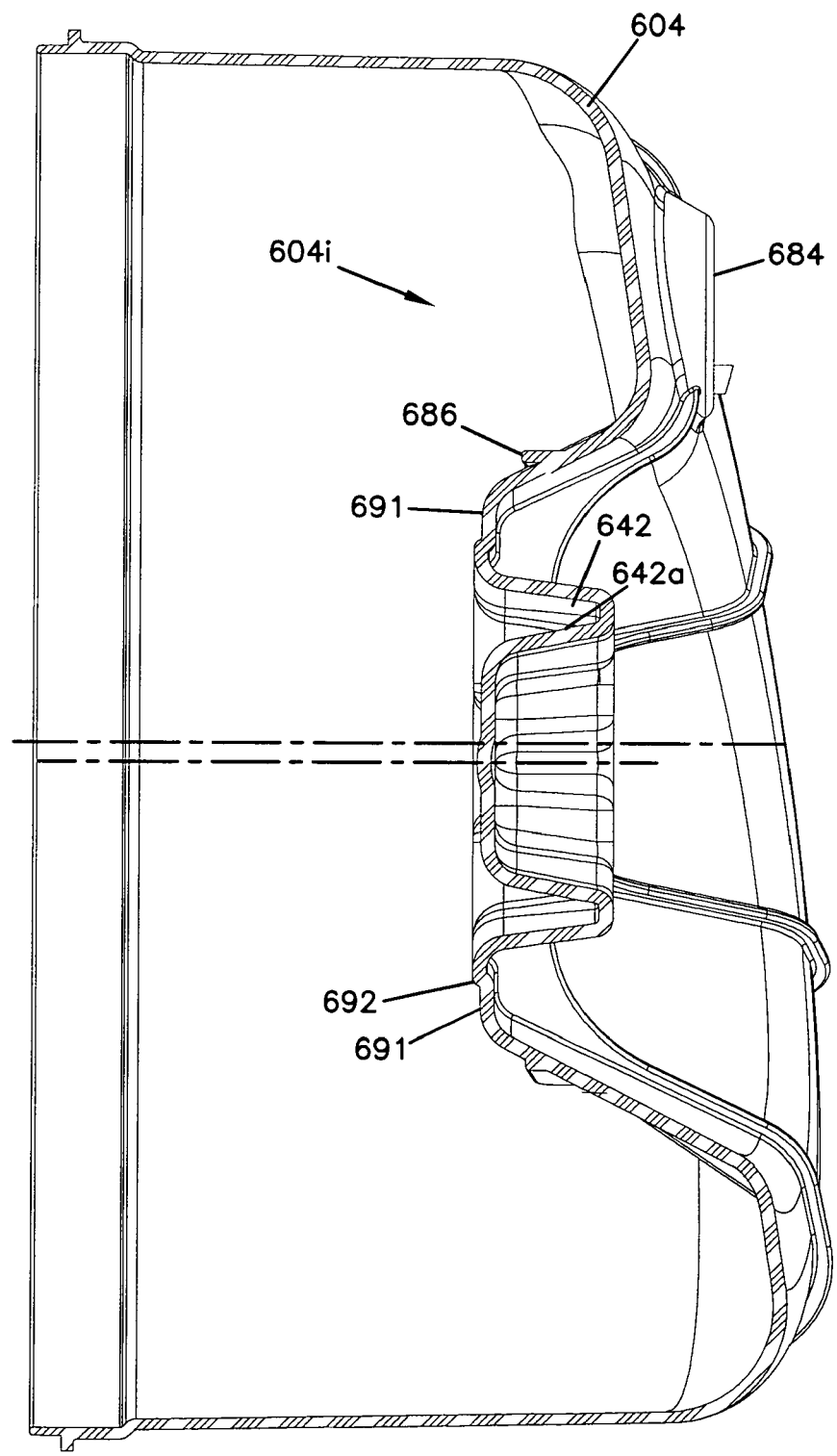
FIG. 24 is a schematic cross-sectional view taken along line 24-24, FIG. 22.
Figure 25:
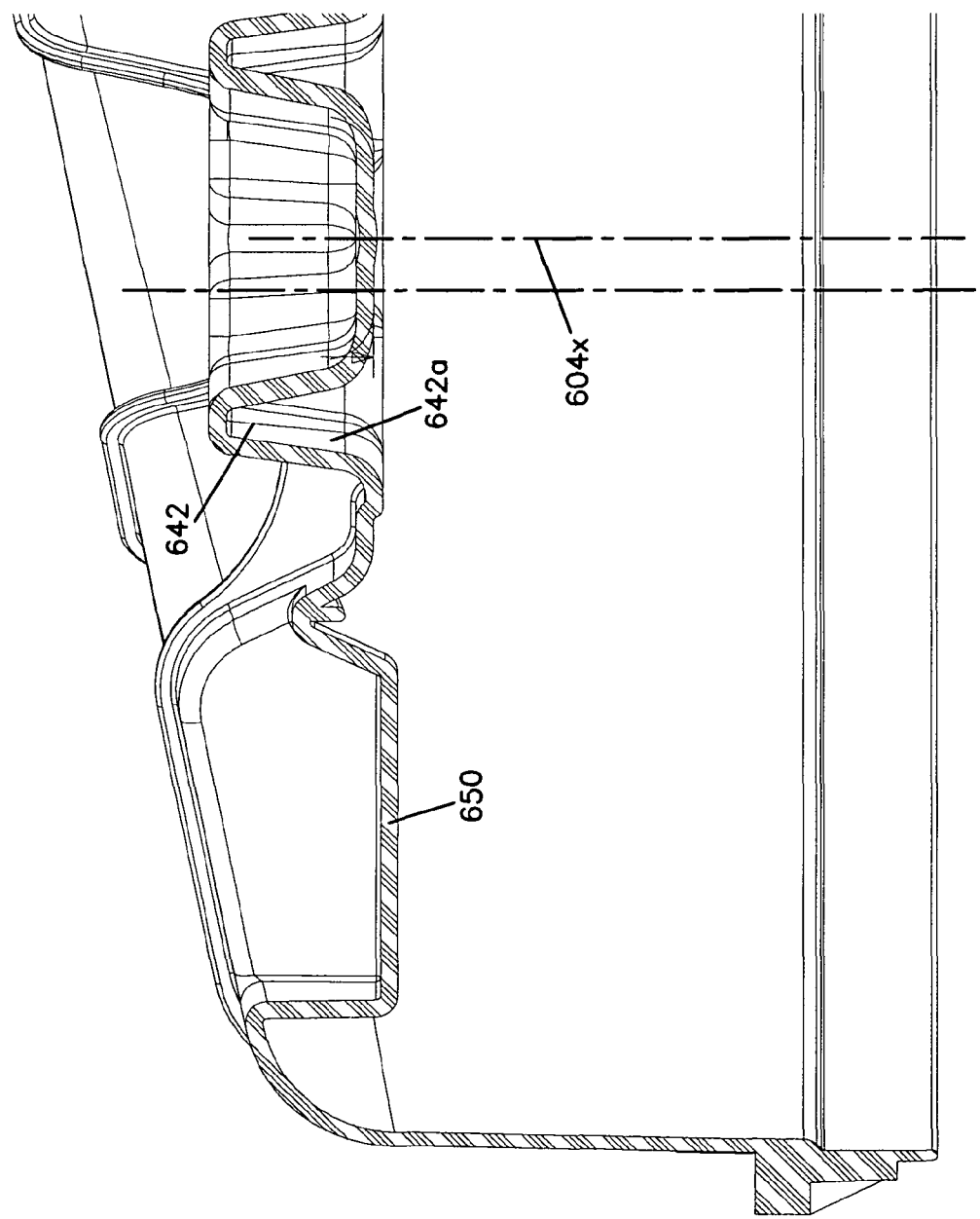
FIG. 25 is schematic, enlarged fragmentary view of taken along line 25-25, FIG. 22.

FIG. 24 is a schematic cross-sectional view generally taken along line 24-24, FIG. 22. Here one of the fins or ribs 686 is viewable in cross-section. FIG. 25, previously discussed, is taken generally along line 25-25, FIG. 22.

It is noted that in addition to fins or ribs 685, 686 inhibiting support an improper cartridge in the housing, the fins or ribs 685, 686 also provide for a stiffening of the access cover 604, in the region surrounding projection/receiver member 642.

Figure 27:
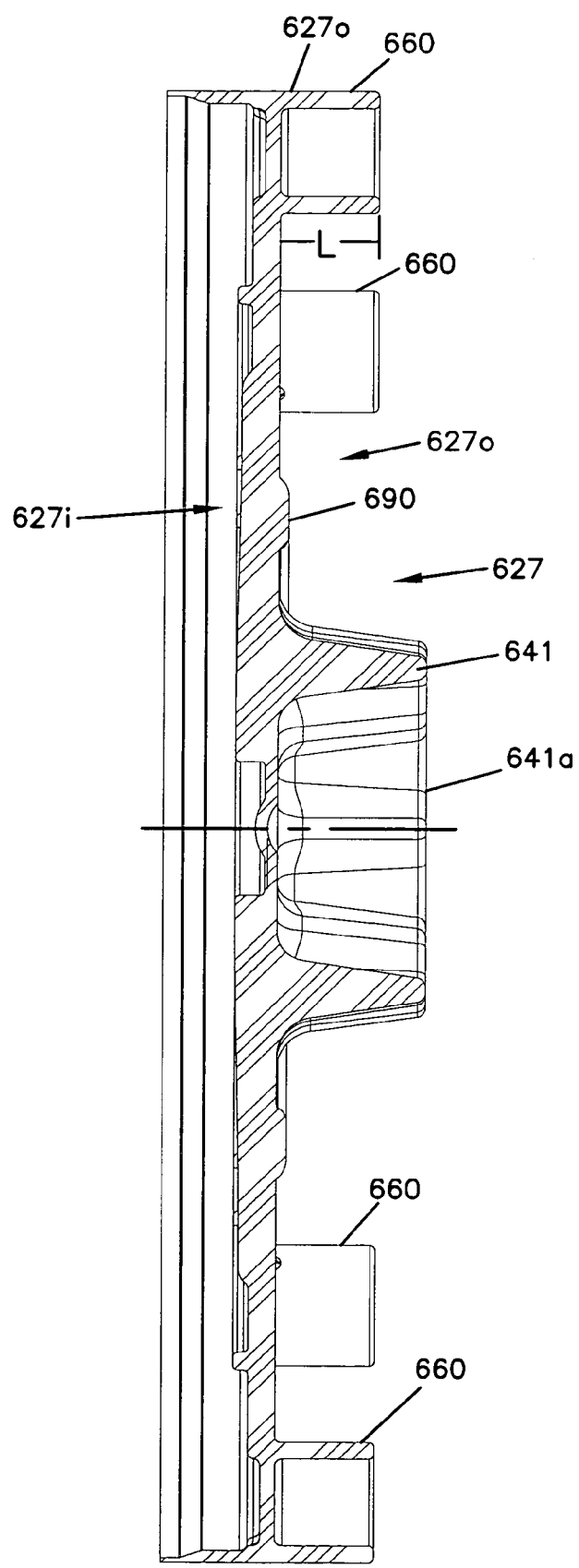
FIG. 27 is a schematic, enlarged cross-sectional view of the end cap component of FIG. 26, taken generally along line 27-27, thereof.

Referring to FIG. 27, attention is directed to axial alignment ring 690, on an outer surface 627o of end cap 627. An opposite surface 627i, of end cap 627 is also viewable.

Referring to FIG. 20, ring 690 is shown in axial alignment with projection 691 on access cover 604. This region 691 of access cover 604 is also viewable in FIG. 24. The alignment between projection 691 and ring 690 again helps ensure that a proper cartridge is positioned within housing 602.

In more general terms, the cartridge 605 including on end cap 627, an outer, axial alignment ring 690. The axial alignment ring 690 is generally positioned circumscribing projection 641a, and spaced radially therefrom. The axial alignment ring 690 is also a region of projection axially outwardly, from adjacent portions of end cap 627. The axial alignment ring 690 is positioned axial aligned with, and in some instances to abut, ring 691 on cover 604. This engagement generally involves ring 690 surrounding shoulder 692, FIG. 24, on cover 604; the shoulder 692 generally adjacent an inner portion of ring 691; the ring 691 circumscribing receiver 642a.

In general, the assembly of FIGS. 20-28 will operate analogously to previously described arrangements. The additional features characterized, help ensure that:

(a) the cartridge 605 is positionable in alternate air cleaner housings; and, (b) an improper cartridge is not installed in housing 602.

VII. Summary of Detailed Description

In the figures, a specific example of an air cleaner assembly including features and components according to the present disclosure is described and shown. There is no specific requirement that an arrangement include all of the features described and depicted, in order to obtain some benefit of the present disclosure.

In general terms, an air cleaner assembly is provided. The air cleaner assembly includes an air cleaner housing defining a housing interior. The air cleaner housing generally comprises a housing body and an access cover.

In an example shown, the housing body defines a side wall and a first end with a housing end surface and an air flow passage therethrough. An outlet flow tube projects both into the interior of the housing body and exterior of the housing body, the air flow passage projecting therethrough.

The second end into the housing body, opposite the first end, is open and comprises an access end for installation and removal of the filter cartridge, during use.

The housing generally includes an air flow inlet therein. The air flow inlet can be in the housing body or the access cover. In the example shown, the air flow inlet is a side inlet in the housing body. This will be typical.

The access cover includes a member of a projection/receiver arrangement thereon. In the example depicted, although alternatives are possible, the access cover includes a receiver, in the form of a serpentine receiving groove on an inner surface of the cover. The serpentine receiving groove is defined between inner and outer serpentine side walls. By the term "serpentine" in this context, it is meant that the groove, which fully extends radially around a center, comprises a plurality of alternating outwardly directed convex and inwardly directed convex (or outwardly directed concave) sections. Preferably the groove is configured so as not to define, within the groove, a circular path that avoids the serpentine (i.e., alternating convex outer and convex inner) sections.

A serviceable filter cartridge is operably positioned within the housing interior. By the term "serviceable" in this context, it is meant that the filter cartridge can be installed within the housing and then be removed from the housing, without damage to the cartridge or the housing.

The filter cartridge comprises a media pack extending between first and second ends or end caps. The media pack surrounds and defines an open filter interior.

In general, the media pack includes filter media, and may comprise one or more of a variety of forms of media. A typical example comprises pleated media extending around the open interior. The pleated media can be provided in a cylindrical or conical form.

The media pack can include one or both of inner and outer liners, to support the media. A variety of liners can be used, including, for example, plastic liners or metal liners. Typically liners, when used, have open volume, for permitting air flow therethrough.

When the media is pleated, it can be provided with a variety of arrangements to maintain pleat spacing including, for example, adhesive beads around the media pack, various types of corrugations in the media pack and various types of folds in the media pack.

The first end cap of the example serviceable filter cartridge depicted has an air flow aperture therethrough. The example cartridge includes a seal member thereon. An example seal member is depicted surrounding the air flow aperture and generally positioned to surround, and seal to, an outer surface of a portion of the outlet tube on the housing, along a portion projecting into the housing interior.

In the example depicted, the second end cap is typically a closed end cap and includes a member of the projection/receiver arrangement thereon. In the example shown, the closed end cap includes an outer projection arrangement projecting in a direction away from the first end cap. The outer projection arrangement is supportably, non-rotatably, received within the receiving groove in the access cover.

By "supportably received within the receiving groove", it is meant that the engagement of the outer projection arrangement on the second end cap with the receiving groove, prohibits the end of the cartridge which is closed from undesirable levels rocking up and down or side to side, within the housing. By "non-rotatably" received within the serpentine groove, it is meant that the engagement between the outer projection arrangement of the receiving groove is such that the cartridge cannot substantially rotate independently of the access cover. As a result of the engagement between the projection arrangement on the cartridge and the receiving groove, the cartridge is prevented from rotating an undesirable amount within the housing, when the access cover is in place.

In a typical assembly depicted, the retaining groove is a serpentine receiving groove, and the groove is a continuous groove positioned between first and second wall members. By "continuous" in this context, it is meant that the groove is not interrupted by projections extending there across which would block the groove.

In a typical assembly, the serpentine retaining groove has an innermost portion (innermost 60%) which is no greater than 14 mm wide, into which at least a portion of the projection arrangement is received. That is, the narrowest portion of the serpentine retaining groove into which at least a portion of the projection arrangement is received, is no more than 14 mm wide. Typically that portion of the retaining groove is within the range of 5 to 12 mm wide, inclusive.

It is not meant, however, that no portion of the serpentine retaining groove is wider. Rather, it is simply meant the narrowest, deepest, portion into which the projection arrangement extends, is typically as defined, although alternatives are possible.

Typically, at least a portion of the projection arrangement extends at least 8 mm into the receiving groove, usually at least 12 mm, and often within the range of 15 to 30 mm, inclusive.

Typically, the receiving groove is a serpentine receiving groove which comprises at least five (5) each of alternating concave and convex sections, in extension around a center. In a typical example, a serpentine receiving groove comprises a plurality of concave portions and convex portions, in extension around a center, including six (6) to ten (10) concave portions inclusive and six to ten (6-10) convex portions inclusive. It is noted that a concave section can be viewed as an inwardly directed convex section when viewed from the interior; and, a convex section can be used as an outwardly directed concave section when viewed from the interior.

In a specific example shown in FIGS. 1-9, the serpentine receiving groove comprises eight (8) convex sections (outwardly directed concave sections when viewed from the interior) and eight (8) concave sections (inwardly directed convex sections when viewed from the interior); the sections alternating with respect to one another along the extension of the serpentine retaining groove around a center.

The serpentine receiving groove, when formed from a plurality of petals having the same size and shape, can be said to have a rotational symmetry corresponding to the number of petals. Thus the eight petal arrangement depicted, has an eight fold symmetry around a central axis. By this it is meant that the configuration can be rotated ⅛ of a turn and still align with itself, ⅜ of a turn, etc. A similar symmetry is provided in the typical projection arrangement, depicted.

In the example depicted, FIG. 2, the access cover is provided with an outer, for example circular, side wall. The circular side wall can, in some instances, surround portions of the cartridge, in the assembled housing. In an example depicted, the air filter cartridge is positioned in a housing with no portion of the access cover surrounding the air filter cartridge other than the outer (circular) side wall. That is, there is no internal shield or flange, or cartridge support arrangement, or air flow directing arrangement, which surrounds the cartridge at the closed end and which is inwardly spaced from the outer wall of the access cover.

In an example shown, the access cover includes an inner surface with a projection region. The projection region includes the receiving groove therein, and comprises an inner wall and an outer wall each of which is serpentine. A fin arrangement is shown extending radially outwardly from the projection region. Each of the fins projects generally toward the first end of the housing, from the access cover. There is typically at least one fin, usually at least two, often 3-5. In the example depicted there are three such fins. The fins provide strength and rigidity to the portion of the access cover in which they are positioned. In addition the fins can be used to inhibit cartridge support by the access cover in a manner that does not involve the receiving groove.

When the fins are configured to inhibit support of the cartridge by projection into the cartridge, the fins are sometimes referred to herein as an "anti-cantilevered support" arrangement.

In an example shown, the access cover includes a second fin arrangement thereon, this fin arrangement comprising a plurality of tangentially oriented fins or ribs defining a straight-sided pattern around a projection region (including a recess) on the inner surface of the access cover. In the example shown, this fin arrangement comprises six fins or ribs defining a generally hexagonal pattern. These fins or ribs provide stiffening in the access cover, as well as inhibit an inappropriate cartridge from obtaining support by the access cover 604.

The projection arrangement on the filter cartridge generally includes at least one radially outwardly convex portion. The convex portion is typically positioned on a curve that does not correspond to a circle centered around a center point of the second end cap.

Typically the projection arrangement on the serviceable filter cartridge includes at least one radially inwardly convex portion (i.e., at least one radially outwardly concave portion.)

In the example depicted, the projection arrangement on the serviceable filter cartridge includes a plurality of radially outwardly convex portions and a plurality of radially inwardly convex portions sometimes referenced as outward concave portions. In the particular example depicted, these portions form a continuous, serpentine, wall. The particular example of a continuous serpentine wall depicted in the drawings, is a closed, continuous, solid wall, i.e., it has no apertures therethrough and is not hollow.

Typically the projection arrangement of the serviceable filter cartridge projects away from an immediately adjacent region of the second end cap a distance of at least 10 mm, usually at least 15 mm and often within the range of 20 to 40 mm, inclusive.

Also typically the projection arrangement of the serviceable filter cartridge projects axially outwardly beyond an end of the media pack a distance of at least 10 mm, usually at least 15 mm and often within the range of 20 to 80 mm. That is, in a typical arrangement, the projection arrangement is not part of a deep, inner, well, in the second end cap, which projects into the cartridge.

In an example depicted, filter cartridge includes an axial alignment ring on an outer surface of the closed end cap, surrounding and spaced from a projection on the closed end cap. The axial alignment ring is positioned to align, and in some instances abut, an alignment ring positioned on an inner surface of the access cover, surrounding and spaced from the receiver arrangement on the access cover. An inner shoulder of the ring in the access cover, can be surrounded by the axial alignment ring on the filter cartridge, when installed.

Also, according to the present disclosure, an air filter cartridge arrangement is provided. The air filter cartridge is useable as a serviceable filter cartridge, in a air cleaner assembly. An example of an air filter cartridge (and the corresponding air cleaner assembly) is described and depicted.

In general, the air filter cartridge includes a media pack surrounding an open interior having first and second opposite ends. As previously discussed, the media pack includes filter media. The media can be a variety of types of media, but will typically be pleated media.

The media pack can also include one or both of an inner and outer media support liner. Typically plastic and/or metal liners would be used.

The media pack can be configured in a cylindrical shape or a conical shape.

The cartridge includes a first end cap positioned on the first end of the media pack. The first end cap has a central air flow aperture therethrough.

A seal is provided on the closed end cap. In the example depicted, an inwardly directed radial seal is provided on the first end cap surrounding the air flow aperture. This radial seal can comprise an integral molded portion of the end cap, although alternatives are possible. The first end cap will typically be molded-in-place, for example from polyurethane foam.

A second end cap is positioned on the second end of the media pack, opposite the first end cap. The second end cap is typically a closed end cap. In an example shown, the second end cap includes a projection arrangement thereon projecting away from the first end cap. The projection arrangement is non-circular and includes at least one arcuate section; the at least one arcuate section having or defining an arc curve which is not co-extensive with a circle surrounding a center point of the end cap.

The at least one arcuate section can comprise a portion of a projection arrangement including a plurality of outwardly projecting convex sections, and inwardly directed convex sections, for example alternating in a serpentine arrangement. The serpentine arrangement can comprise a single, continuous, wall around a center of the end cap.

The second end cap of the cartridge can further include an axial alignment ring on an outer surface thereof. The axial alignment ring is generally positioned surrounding, and radially spaced from, the projection on the second end cap. This ring is positioned to align with the axial alignment ring on the access cover, when the cartridge is properly installed.

There is no specific requirement that an arrangement include all of the specific features described and shown in connection with the example depicted herein, unless otherwise stated. An arrangement can include only selected ones of the features characterized herein, and still obtain advantage according to the present disclosure.

What is claimed is:

1. An air filter cartridge comprising:
   (a) a media pack surrounding an open interior and including media having first and second, opposite, ends;
   (b) a first end cap positioned at the first end of the media pack;
      (i) the first end cap having a central air flow aperture therethrough;
   (c) a housing seal arrangement on the first end cap;
      (i) the housing seal arrangement surrounding the central air flow aperture and defining an inwardly directed radial seal;
   (d) a second end cap on the second end of the media;
      (i) the second end cap including a first projection thereon extending in direction away from the first end cap to a location not surrounded by media of the media pack;
      (ii) the first projection comprising a continuous serpentine wall having a radially inner surface and a radially outer surface; and, surrounding an interior surface;
      (iii) the radially inner surface of the serpentine wall having eight inwardly convex sections and eight inwardly concave sections alternating with one another; and,
      (iv) the radially outer surface of the serpentine wall having eight outwardly convex sections and eight outwardly concave sections alternating with one another; and,
   (e) a plurality of spaced projections positioned adjacent the outer perimeter of the second end cap;
      (i) each one of the spaced projections being at least 10 mm long; and,
      (ii) each one of the spaced projections extending in a direction away from the media and the second end cap.

2. An air filter cartridge according to claim 1 wherein:
   (a) the first end cap is a soft compressible end cap.

3. An air filter cartridge according to claim 1 wherein:
   (a) the first projection extends away from adjacent portions of the second end cap at least 10 mm.

4. An air filter cartridge according to claim 3 wherein:
   (a) the first projection extends away from adjacent portions of the second end cap an amount within the range of 20-40 mm.

5. An air filter cartridge according to claim 1 wherein:
   (a) the radially outer surface of the serpentine wall slants inwardly, along a direction of extension away from an adjacent region of the second end cap; and,
   (b) the radially inner surface of the serpentine wall slants outwardly, along a direction of extension away from an adjacent region of the second end cap.

6. An air filter cartridge according to claim 5 wherein:
   (a) the radially outer surface slants inwardly at an angle within the range of 3°-7°, inclusive; and,
   (b) the radially inner surface slants outwardly at an angle within the range of 3°-7°, inclusive.

7. An air filter cartridge according to claim 1 wherein:
   (a) the serpentine wall is a solid, closed, wall.

8. An air filter cartridge according to claim 1 wherein:
   (a) the interior surface of the continuous serpentine wall has a smallest internal dimension thereacross of at least 15 mm.

9. An air filter cartridge according to claim 8 wherein:
   (a) the interior surface of the continuous serpentine wall has a smallest internal dimension thereacross of at least 20 mm.

10. An air filter cartridge according to claim 1 wherein:
    (a) the serpentine wall has a tip; and,
    (b) the serpentine wall has a depth of extension, from the tip, over a distance of at least 6 mm in which the thickness of the serpentine wall, corresponding to a width between the radially outer surface and the radially inner surface, does not exceed 10 mm.

11. An air filter cartridge according to claim 1 wherein:
    (a) the serpentine wall has a tip; and,
    (b) the serpentine wall has a depth of extension, from the tip, over a distance of at least 6 mm to which the thickness of the serpentine wall, corresponding to a width between the radially outer surface and the radially inner surface, is at least 4 mm.

12. An air cleaner assembly comprising:
    (a) an air cleaner housing including an air flow inlet and an air flow outlet; the air cleaner housing defining a housing interior and comprising a housing body and an access cover; and,
    (b) a filter cartridge operably positioned in the air cleaner housing; the filter cartridge comprising:
       (i) a media pack surrounding an open interior and including media having first and second, opposite, ends;
          (A) a first end cap positioned at the first end of the media pack;
             (1) the first end cap having a central air flow aperture therethrough;
       (ii) a housing seal arrangement on the first end cap;
          (A) the housing seal arrangement surrounding the central air flow aperture and defining an inwardly directed radial seal;
       (iii) a second end cap on the second end of the media;
          (A) the second end cap including a first projection thereon extending in direction away from the first end cap to a location not surrounded by media of the media pack;

(B) the first projection comprising a continuous serpentine wall having a radially inner surface and a radially outer surface;

(C) the radially inner surface of the serpentine wall having eight inwardly convex sections and eight inwardly concave sections alternating with respect to one another; and, (D) the radially outer surface of the serpentine wall having eight outwardly convex sections and eight outwardly concave sections alternating with respect to one another; and, (iv) a plurality of spaced projections positioned adjacent the outer perimeter of the second end cap;

(A) each one of the spaced projections being at least 10 mm long;

(B) each one of the spaced projections extending in a direction away from the media and the second end cap;

(c) the air cleaner housing seal arrangement on the first end cap being releaseably sealed to the housing; and, (d) the access cover including a serpentine ring member defining a receiving groove having a serpentine inner wall and a serpentine outer wall, and, (iii) the continuous serpentine wall on the second end cap projecting into the receiving groove on the access cover with the serpentine inner wall of the receiving groove surrounded by the radially inner surface of the continuous serpentine wall, and with the serpentine outer wall of the receiving groove surrounding the radially outer surface of the continuous serpentine wall.

13. An air cleaner assembly according to claim 12 wherein:
(a) the interior surface of the continuous serpentine wall has a smallest internal dimension thereacross of at least 15 mm.

14. An air cleaner assembly according to claim 13 wherein:
(a) the interior surface of the continuous serpentine wall has a smallest internal dimension thereacross of at least 20 mm.

15. An air cleaner assembly according to claim 14 wherein:
(a) the serpentine wall has a tip; and,
(b) the serpentine wall has a depth of extension, from the tip, over a distance of at least 6 mm in which the thickness of the serpentine wall, corresponding to a width between the radially outer surface and the radially inner surface, does not exceed 10 mm.

16. An air cleaner assembly according to claim 15 wherein:
(a) the radially outer surface of the serpentine wall slants inwardly, along a direction of extension away from an adjacent region of the second end cap; and,
(b) the radially inner surface of the serpentine wall slants outwardly, along a direction of extension away from an adjacent region of the second end cap.

* * * * *